(12) United States Patent
Coffee

(10) Patent No.: US 11,625,147 B2
(45) Date of Patent: Apr. 11, 2023

(54) AUTOMATION MANAGEMENT INTERFACE WITH MULTIPLE ASSET DISPLAY

(71) Applicant: BEET, Inc., Troy, MI (US)

(72) Inventor: Brock Matthew Coffee, Allen Park, MI (US)

(73) Assignee: BEET, Inc., Troy, MI (US)

( * ) Notice: Subject to any disclaimer, the term of this patent is extended or adjusted under 35 U.S.C. 154(b) by 0 days.

(21) Appl. No.: 16/951,494

(22) Filed: Nov. 18, 2020

(65) Prior Publication Data

US 2021/0089174 A1 Mar. 25, 2021

Related U.S. Application Data

(63) Continuation-in-part of application No. 15/306,959, filed as application No. PCT/US2015/029928 on May
(Continued)

(51) Int. Cl.
*G06F 3/0482* (2013.01)
*G06F 3/04845* (2022.01)
(Continued)

(52) U.S. Cl.
CPC ....... *G06F 3/0482* (2013.01); *G05B 19/4155* (2013.01); *G06F 3/0485* (2013.01);
(Continued)

(58) Field of Classification Search
CPC .............. G06F 3/0482; G06F 3/04845; G06F 3/0485; G06F 2203/04803;
(Continued)

(56) References Cited

U.S. PATENT DOCUMENTS

| 9,070,216 B2 | 6/2015 | Golparvar-Fard et al. |
| 2008/0221721 A1* | 9/2008 | Reed .................. C23C 14/3414 700/109 |

(Continued)

FOREIGN PATENT DOCUMENTS

| CN | 1185212 A | 6/1998 |
| CN | 1417958 A | 5/2003 |

(Continued)

OTHER PUBLICATIONS

Office Action issued by China Intellectual Property Office for Chinese application No. CN201811452271.5, dated Jun. 9, 2021.
(Continued)

*Primary Examiner* — Michael Roswell
(74) *Attorney, Agent, or Firm* — Quinn IP Law

(57) ABSTRACT

A system and method for displaying a combination of automation data collected from one or more assets and analog data collected from a system or element related to the assets can be simultaneously displayed on the display screen in a plurality of concurrently displayed cycle displays. In response to a user input to the display screen, the data display is dynamically manipulated to display varying numbers of operating cycles of the assets and the associated analog data collected in real time with the performance of the operating cycles, such that patterns and/or correlations between the analog data and automation data over a displayed timeline can be viewed and analyzed. The automation data is visually differentiated to indicate a condition state of the operating cycle and assets in real time.

20 Claims, 29 Drawing Sheets

Related U.S. Application Data 8, 2015, now Pat. No. 11,048,219, which is a continuation-in-part of application No. 14/705,421, filed on May 6, 2015, now Pat. No. 10,048,670.

(60) Provisional application No. 62/937,516, filed on Nov. 19, 2019, provisional application No. 61/990,148, filed on May 8, 2014, provisional application No. 61/990,170, filed on May 8, 2014, provisional application No. 61/990,158, filed on May 8, 2014, provisional application No. 61/990,156, filed on May 8, 2014, provisional application No. 61/990,169, filed on May 8, 2014, provisional application No. 61/990,172, filed on May 8, 2014, provisional application No. 61/990,159, filed on May 8, 2014, provisional application No. 61/990,151, filed on May 8, 2014, provisional application No. 61/990,163, filed on May 8, 2014.

(51) Int. Cl.
    *G06F 3/0485*     (2022.01)
    *G05B 19/4155*     (2006.01)

(52) U.S. Cl.
    CPC ............ *G06F 3/04845* (2013.01); *G05B 2219/31368* (2013.01); *G06F 2203/04803* (2013.01); *G06F 2203/04806* (2013.01)

(58) Field of Classification Search
    CPC ...... G06F 2203/04806; G05B 19/4155; G05B 2219/31368; G05B 2219/31467; G05B 19/4184; Y02P 90/02
    See application file for complete search history.

(56) References Cited

U.S. PATENT DOCUMENTS

| | | | |
|---|---|---|---|
| 2012/0242648 | A1* | 9/2012 | Baier ................. G05B 19/409 345/418 |
| 2012/0310865 | A1 | 12/2012 | Wang |

FOREIGN PATENT DOCUMENTS

| | | |
|---|---|---|
| CN | 102906957 A | 1/2013 |
| CN | 103176582 A | 6/2013 |
| CN | 103576819 A | 2/2014 |

OTHER PUBLICATIONS

Search report issued by China Intellectual Property Office for Chinese application No. CN201811452271.5, dated Jun. 9, 2021.
International search report dated Feb. 10, 2021, for international application No. PCT/US20/61233 .

\* cited by examiner

AUTOMATION MANAGEMENT INTERFACE WITH MULTIPLE ASSET DISPLAY

RELATED APPLICATIONS

This application claims priority to and the benefit of United States Provisional Application No. 62,937,516 filed Nov. 19, 2019, U.S. patent application Ser. No. 15/306,959 filed Oct. 26, 2016, PCT Application PCT/US2015/029928 filed May 8, 2015, U.S. application Ser. No. 14/705,421 filed May 6, 2015, U.S. Provisional Application 61/990,148 filed May 8, 2014, U.S. Provisional Application 61/990,151 filed May 8, 2014, U.S. Provisional Application 61/990,156 filed May 8, 2014, U.S. Provisional Application 61/990,158 filed May 8, 2014, U.S. Provisional Application 61/990,159 filed May 8, 2014, U.S. Provisional Application 61/990,163 filed May 8, 2014, U.S. Provisional Application 61/990,169 filed May 8, 2014, U.S. Provisional Application 61/990,170 filed May 8, 2014, and U.S. Provisional Application 61/990,172 filed May 8, 2014, the contents of each of which are hereby incorporated by reference in their entirety.

TECHNICAL FIELD

The present disclosure relates generally to dynamically displaying automation data to a display screen of a computing device, where the automation data is captured and collected from automated equipment, using an automation controller in communication with automated equipment and the computing device.

BACKGROUND

A facility may include automated equipment including multiple machines organized into multiple lines. Each machine can be controlled by a programmable logic controller (PLC) or similar controller connected to the machine and/or multiple stations, fixtures, and elements of the machine, which may collectively be referred to as assets. The controller in communication with the assets receives automation data including inputs to the controller indicating condition states of the various machines, stations, fixtures and elements. The automation data can be used by the controller to determine cycle times and condition states for each cycle of an operation performed by an asset. This data can be outputted to a display screen of a computing device for display. When the outputted data is displayed on the display screen only for a single asset, or display only for one cycle of a sequence of operation, interactions between assets, e.g., between machines, stations, fixtures, and elements are difficult to identify, variations between cycles are not visually apparent, and opportunities to increase facility efficiency and decrease facility downtime can be missed.

SUMMARY

A system and method is provided herein for dynamically displaying automation data to a display screen of a computing device, where the automation data is captured and collected from automated equipment into an Automation Operating System (AOS), using an automation controller in communication with automated equipment and the computing device. The system and method described herein is advantaged by the capability to display on a display screen a plurality of differently configured automation data displays generated from a plurality of corresponding display templates populated with real time data, to allow a user to monitor and analyze multiple automated assets in real time, and/or to monitor and analyze multiple operating cycles of an operation performed by an asset in real time, such that the identification of opportunities for improvement of the automated operations and/or assets is expedited. The system and method described herein is further advantaged by the capability of a user to manipulate the automation data displays to dynamically zoom in and out on a display, to seamlessly transition the displays between different levels of information detail, and to manipulate the automation data displays to pan between different time periods and cycles of the automation operations. In one example, automation data for multiple assets can be simultaneously displayed on the display screen, at various levels of information detail, for comparison and analysis. In one example, automation data for multiple operating cycles of operation of an asset can be simultaneously displayed on the display screen.

The system and method described herein for displaying automation data for an automation system via an automation data display, in a non-limiting example, includes an automation system comprising a plurality of assets, each asset of the plurality of assets actuable to perform at least one operation of an ordered sequence of operations (SOP) for a plurality of operating cycles, a server configured to collect automation data from the plurality of assets and to store the automation data to a memory in communication with the server, the memory having stored thereon the sequence of operations, an asset tree identifying the plurality of assets, a plurality of automation data templates and computer-executable instructions configured to generate a plurality of automation data displays and output the plurality of automation data displays and automation data in response to receipt of a user input from a user device, and the user device including a user interface actuable to display automation data including the plurality of automation data displays. The automation system is configured and actuable to display an asset tree display on the user interface of the user device, the asset tree display displaying the plurality of assets, and to receive a first user input to the user interface indicating a selection of a first asset of the plurality of assets. The automation system is further configured to generate in real time, a first cycle display of the first asset performing the at least one operation for a plurality of operating cycles, where the first cycle display is selected from the group consisting of: a cycle status display, a heartbeat cycle state display, and a sequence of operations (SOP) cycle display. The automation system is further configured to display, via the user interface, the first cycle display and a timeline display, where the timeline display displays an actual time associated with the first asset performing the at least one operation for each operating cycle of the plurality of operating cycles displayed via the first cycle display.

The automation system is further configured to generate an actual cycle time for each operating cycle of the plurality of operating cycles performed by the first asset, via the automation system, to determine a condition state for each operating cycle of the plurality of operating cycles performed by the first asset, via the automation system, and to display, via the first cycle display, an indication of the actual cycle time and an indication of the condition state for each operating cycle of the plurality of operating cycles performed by the first asset. In one example, the first cycle display is the cycle status display, the indication of the actual cycle time is a cycle status bar displaying a cumulative status of actual cycle times determined for operating cycles performed in a time period displayed by the display timeline, and the indication of the condition state is determined by a comparison of the actual cycle time to a baseline cycle time of the operating cycle. In another example, the first cycle display is the heartbeat cycle state display, the indication of the actual cycle time is a heartbeat cycle bar displaying an actual cycle time determined for each operating cycle performed by the first asset in a time period displayed by the display timeline, and the indication of the condition state is determined by a comparison of the actual cycle time to a baseline cycle time of the operating cycle. In another example, the first cycle display is the SOP cycle state display, the indication of the actual cycle time is an actual cycle indicator for the at least one operation, and the system is further configured to display, via the user interface, the at least one operation performed by the first asset, display an actual cycle indicator for the at least one operation, for each operating cycle of the at least one operation performed by the first asset in a time period displayed by the display timeline, where the actual cycle indicator is displayed relative to an actual time the operating cycle is performed by the first asset, and to display a baseline cycle indicator for the at least one operation, for each operating cycle of the at least one operation performed by the first asset, wherein the baseline cycle indicator is displayed relative to the actual cycle indicator.

In an illustrative example, the indication of the condition state includes a first condition state indication and a second condition state indication, where the first condition state indication is a cycle time condition indicated by displaying the baseline cycle indicator relative to the actual cycle indicator and where the second condition state indication is an operating state condition indicated by displaying the actual cycle indicator including a condition state differentiator corresponding to the operating state condition. In this example, the system can be further configured to determine, via the automation system, a second condition state for each operating cycle of the at least one operation performed by the first asset, where the second condition state is one of an acceptable, blocked, starved or faulted condition state, and display the actual cycle indicator including the condition state differentiator corresponding to the second condition state.

The automation system can be configured to receive, by the automation system, a second user input to the user interface, and to modify, in response to the second user input, the first cycle display, where modifying the first cycle display can include zooming the first cycle display or panning the first cycle display, such that zooming the first cycle display actuates the first cycle display and the timeline display to zoom simultaneously, and panning the first cycle display actuates the first cycle display and the timeline display to pan simultaneously. The automation system can be configured to receive, by the automation system, a second user input to a data feature of the first cycle display and display, in response to the second user input, an information window. The information window displays information defined by the data feature, where in an illustrative example, the data feature is one of the indication of the actual cycle time or the indication of the condition state.

The automation system, in one example, is further configured to receive, by the automation system, a second user input to the first cycle display, select, via the second user input, a first time period displayed by the first cycle display, generate, in response to the second user input, a second cycle display, and display, via the user interface, the second cycle display for the first time period. In this example, the second cycle display can be selected from the group consisting of: a cycle status display, a heartbeat cycle state display, and a sequence of operations (SOP) cycle display. In this example, the timeline display displays the actual time associated with the first asset performing the at least one operation for each operating cycle of the plurality of operating cycles displayed via the second cycle display, and the second cycle display, the first cycle display and the timeline display are concurrently displayed on the user interface. In an illustrative example, the first cycle display can be configured as the cycle status display and the second cycle display can be configured as the heartbeat cycle state display. The automation data display can further display a first orientor in the first cycle display, where the first orientor identifies the first time period in the first cycle display.

In a non-limiting example, the automation system is further configured to display a display menu on the user interface, receive, by the automation system, a third user input to the display menu, select, via the third user input, an analog parameter associated with the sequence of operations, and generate, in response to the third user input, an analog parameter display. The analog parameter display is configured to display analog data for the selected analog parameter in real time with the timeline display displaying the actual time associated with the plurality of operating cycles displayed via the second cycle display. The example further includes displaying, via the user interface, the analog parameter display for the first time period, such that the analog parameter display, the second cycle display, the first cycle display and the timeline display are concurrently displayed on the user interface.

The automation system is further configured to receive, by the automation system, a third user input to the second cycle display, select, via the third user input, a second time period displayed by the first cycle display, generate, in response to the second user input, a third cycle display, and display, via the user interface, the third cycle display for the second time period, where the third cycle display is selected from the group consisting of: a cycle status display, a heartbeat cycle state display, and a sequence of operations (SOP) cycle display, and such that the timeline display displays the actual time associated with the first asset performing the at least one operation for each operating cycle of the plurality of operating cycles displayed via the third cycle display, where the third cycle display, the second cycle display, the first cycle display and the timeline display are concurrently displayed on the user interface. The automation system can be further configured to display a second orientor in the second cycle display, wherein the second orientor identifies the second time period in the second cycle display. In a non-limiting example, the first cycle display is the cycle status display, the second cycle display is the heartbeat cycle state display, and the third cycle display is the SOP cycle state display.

The automation system can be further configured to receive, by the automation system, a fourth user input to the user interface, and modify, in response to the fourth user input, the third cycle display, where modifying the fourth cycle display can include zooming the third cycle display and/or panning the third cycle display, such that zooming the third cycle display actuates the third cycle display and the timeline display to zoom simultaneously, and such that panning the third cycle display actuates the third cycle display and the timeline display to pan simultaneously.

In an illustrative example, the automation system is configured to receive a first input to an asset tree displayed on the user interface, the first input indicating a selection of a first asset of a plurality of assets displayed by the asset tree, and to receive a second user input to the user interface indicating a selection of a second asset of the plurality of assets, where the at least operation performed by the first asset is an at least first operation of the sequence of operations (SOP) and where the second asset is actuable to perform at least a second operation of the sequence of operations (SOP) for the plurality of operating cycles, and to generate, via the automation system and in real time, a second cycle display of the second asset performing the at least one operation for the plurality of operating cycles, where the second cycle display is selected from the group consisting of: a cycle status display, a heartbeat cycle state display, and a sequence of operations (SOP) cycle display. The automation system is further configured, in this example, to display, via the user interface, the second cycle display and the timeline display, such that the timeline display displays an actual time associated with the second asset performing the at least second operation for each operating cycle of the plurality of operating cycles displayed via the second cycle display, and such that the second cycle display, the first cycle display and the timeline display are concurrently displayed on the user interface.

The automation system is further configured to generate an actual cycle time for each operating cycle of the plurality of operating cycles performed by the second asset, via the automation system, to determine a condition state for each operating cycle of the plurality of operating cycles performed by the second asset, via the automation system, and to display, via the second cycle display, an indication of the actual cycle time and an indication of the condition state for each operating cycle of the plurality of operating cycles performed by the second asset. In one example, the first cycle display is the cycle status display for the first asset, and the second cycle display is the cycle status display for the second asset.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 26:
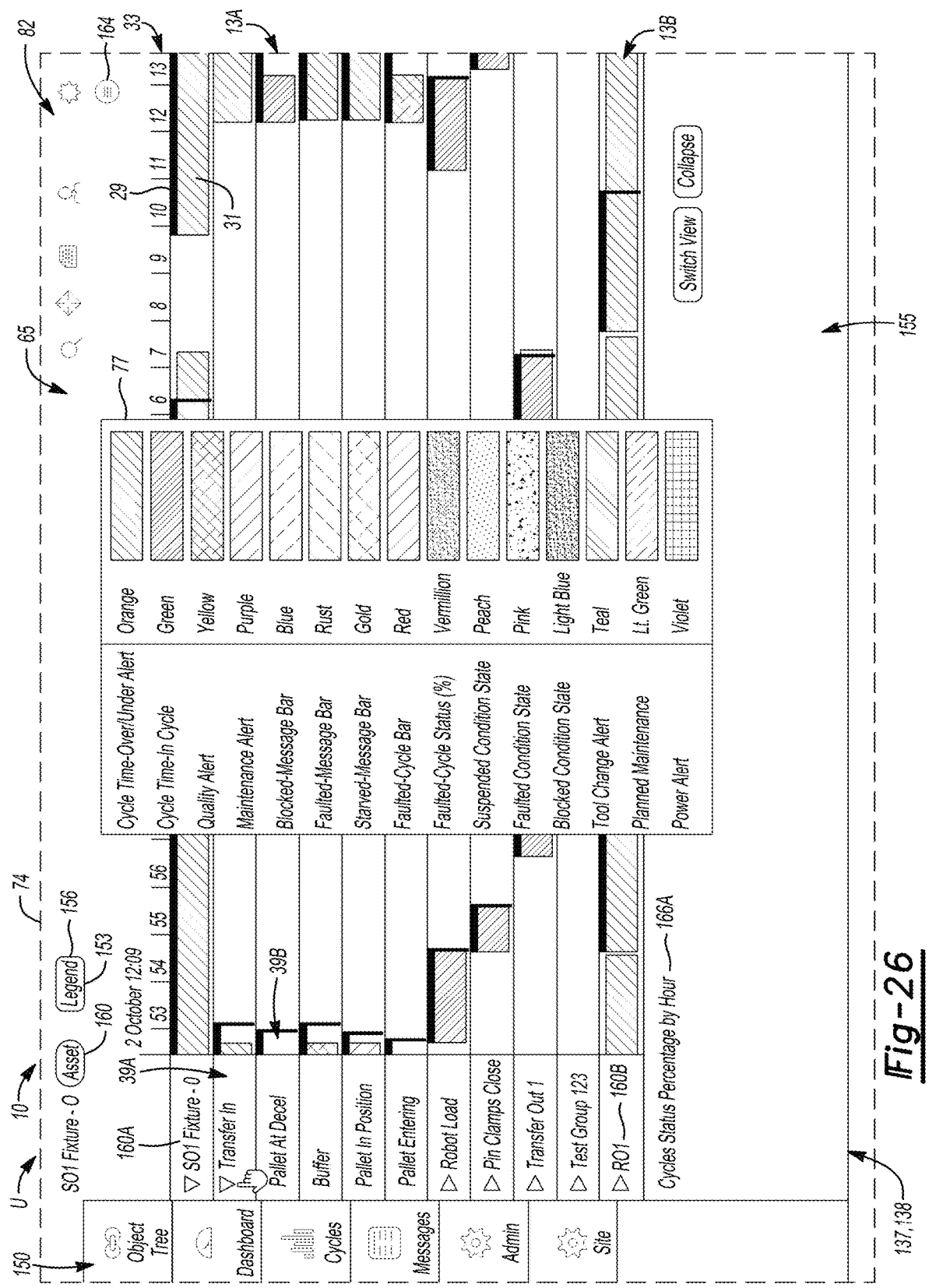
FIG. 26 is a schematic example representation of an automation data display generated by the system shown in FIG. 27, displaying a legend in response to a user input to a legend menu icon, the legend indicating various differentiators including color coding and hatching used to differentiate various data features, where each differentiator is associated with an identified condition state.
Figure 27:
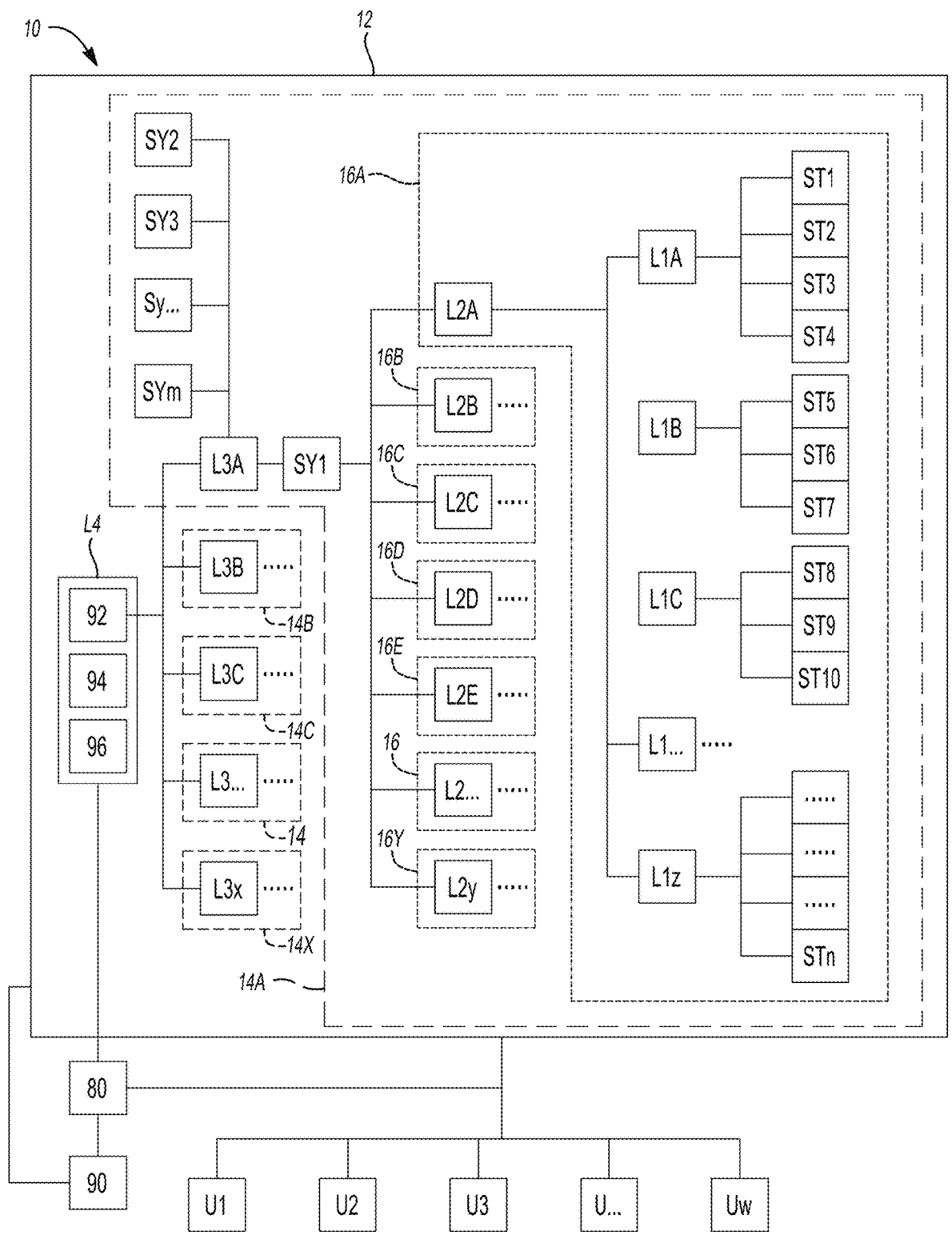
FIG. 27 is a schematic view of an example of an automation operating and management system (AOS) including first, second, third and fourth level controllers.
Figure 28:
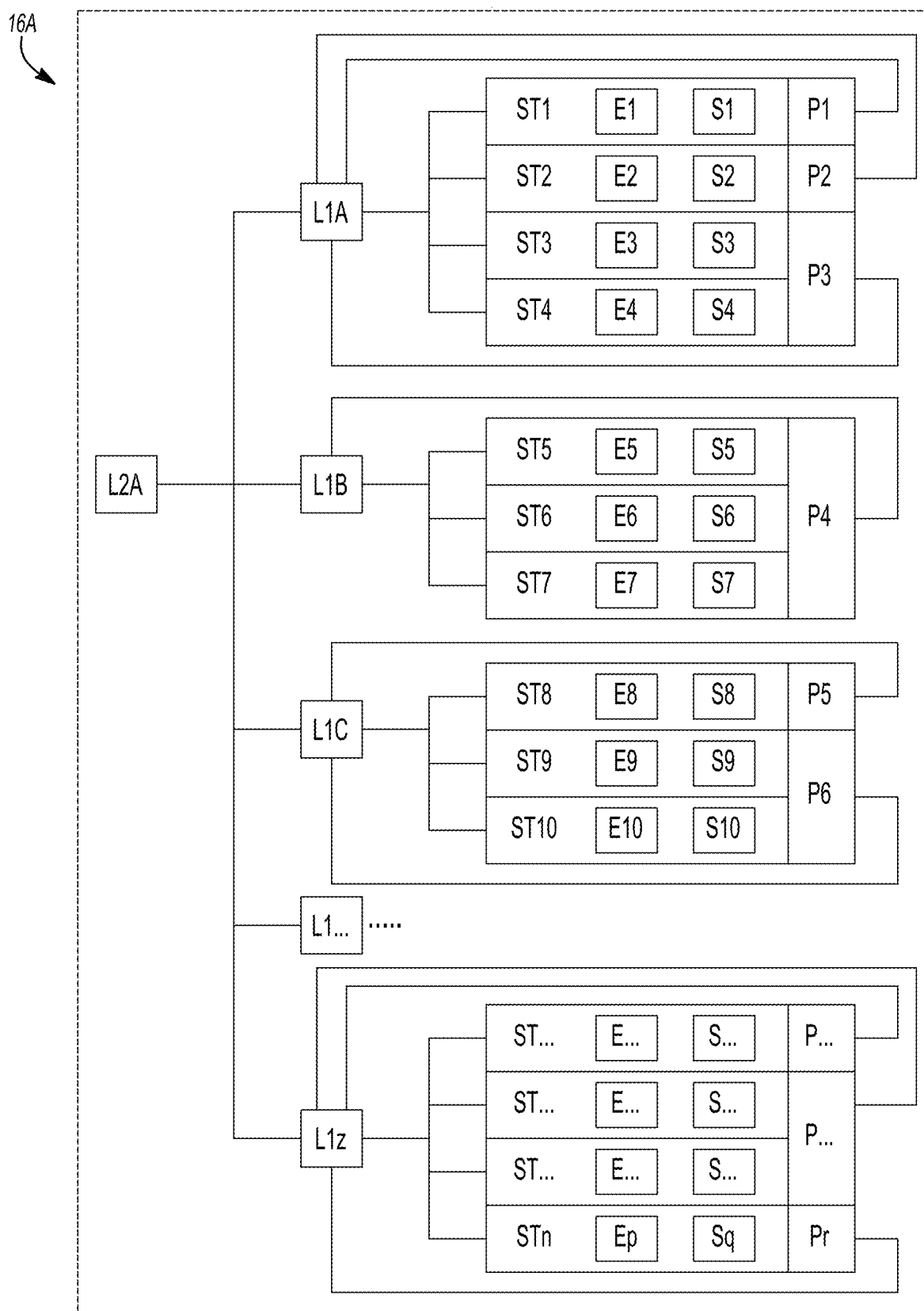
FIG. 28 is a schematic view of an example of a machine of the AOS shown in FIG. 27, the machine including a first level controller and a second level controller.
Figure 29:
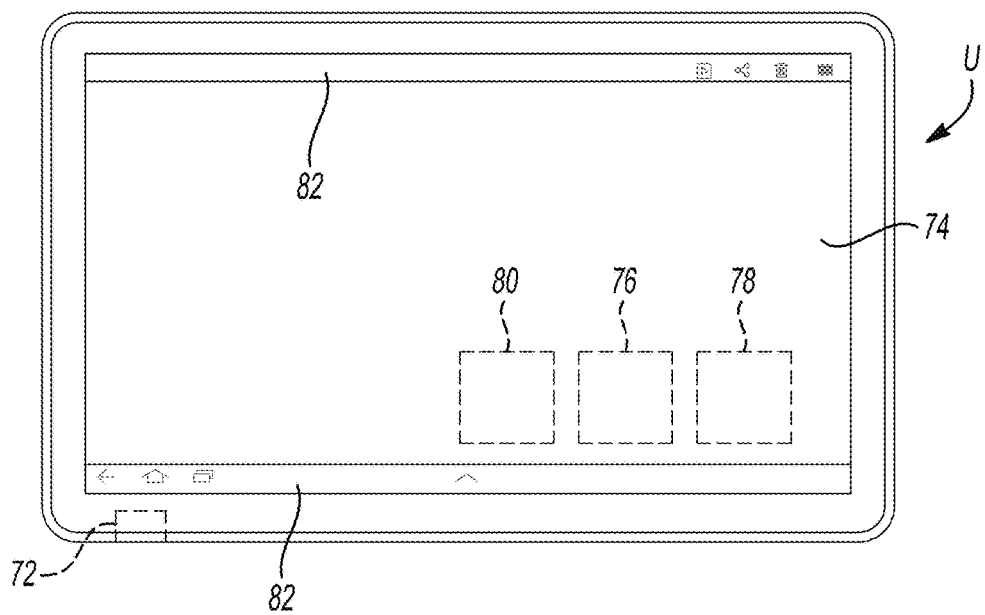
FIG. 29 is a schematic illustration of an example of a user device of FIG. 27.
Figure 30:
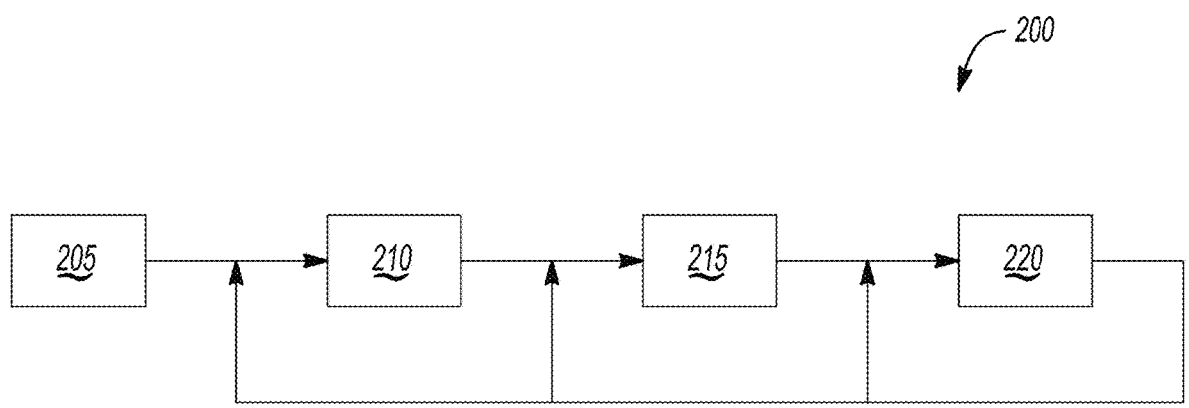
FIG. 30 is a schematic illustration of a method for dynamic display of automation information using the system of FIG. 27.

Referring to the drawings wherein like reference numbers represent like components throughout the several figures, the elements shown in FIGS. 1-30 are not to scale or proportion. Accordingly, the particular dimensions and applications provided in the drawings presented herein are not to be considered limiting. FIGS. 1-26 show examples of automation data displays 138 which can be generated by a server L of an Automation Operating System (AOS) 10 as shown in FIGS. 27-28, for display on a display screen 74 of a user device U as shown in FIG. 29, by populating one or more display templates 137 with data stored within the AOS 10 in communication with the user device U. The display screen 74 of the user device U can also be referred to herein as a user interface 74. An exemplary method 200 of dynamically modifying the automation data display 138 shown on the display screen 74 in response to a user input 153 received by the user interface 74 is shown in FIG. 30 and illustrated by FIGS. 1-26, which are described in further detail herein.

Figure 1:
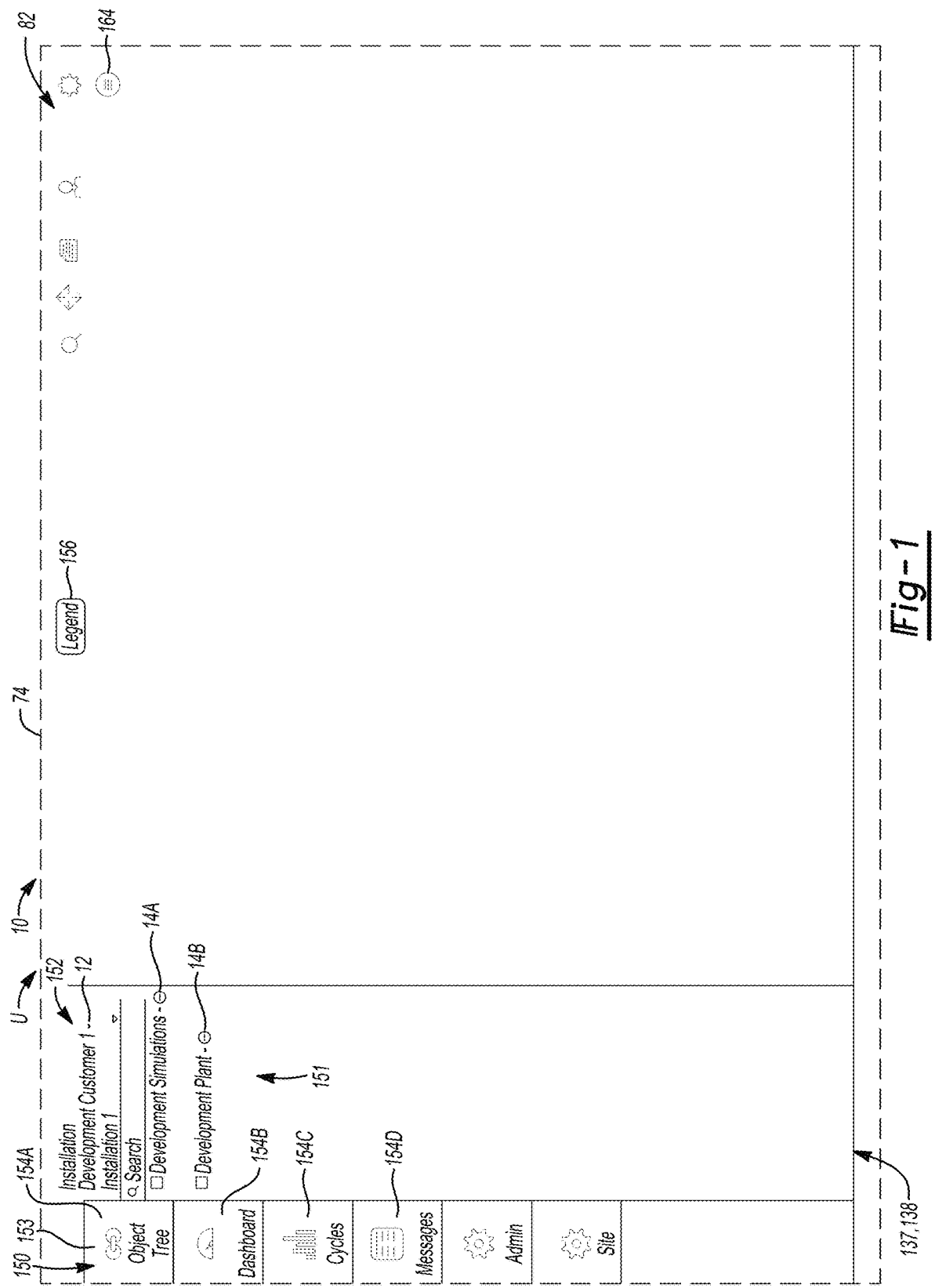
FIG. 1 is a schematic example representation of an automation data display generated by a system shown in FIG. 27 for display on a display screen of a user device shown in FIG. 29, displaying a menu and an asset tree for receiving user input to actuate the automation data display.

In an illustrative example, FIG. 1 shows a display screen 74 for displaying automation information, also referred to herein as automation data, in one or more automation data displays 138, also referred to herein as information displays and/or automation displays. Each automation data display 138 is generated by populating a data template 137 in real time using automation data collected by an automation operating and management system, such as the automation operating and management system 10 shown in FIGS. 27-29, where the automation operating and management system (AOS) 10 is configured for controlling facilities 14, systems SY, machines 16, stations ST, elements E, sensors S, etc. operating within an enterprise 12. The enterprise 12 includes an enterprise server L4 for receiving and consolidating data from multiple facilities 14 within the enterprise 12. Each of the facilities 14 includes a facility server L3 for receiving and consolidating data from multiple facility systems SY within each of the facilities 14. Each facility server L3 is in communication with the enterprise server L4. At least one of the facility systems SY in each of the facilities 14 includes multiple machines 16. The machines 16 can be any machines that perform coordinated operations including automated machines. In an illustrative and non-limiting example described herein the machines 16 can be machines such as automated machines performing operations in a manufacturing plant and/or an assembly facility.

Each machine 16 can include one or more stations ST for performing an ordered sequence of operations OP performed by the machine 16, where the sequence of operations 39 includes operations OP performed by the machine 16 in a predetermined order controlled by a controller L in communication with the machine 16. The predetermined order in which the operations OP are performed can be defined by a sequence of operations 39 for that machine 16 by the controller L. It would be understood that the machine 16 would, in operation, repeatedly perform the sequence of operations 39 comprising the ordered operations OP under control of the machine controller L, such that the automation data collected from the machine 16 would include automation data from each of the repeated operating cycles 15, from which a cycle time for performing each of the repeated operating cycles 15 can be determined for the operation OP being performed.

Each station ST can include one or more elements E for performing various operations and/or tasks of the respective station ST. Using an illustrative example of a manufacturing and/or assembly enterprise 12, examples of elements E used to perform the various operations of a manufacturing and/or assembly operation performed by a machine 16 and/or station ST can include clamps, cylinders, collets, pins, slides, fixtures, pallets, etc., where the examples provided herein are non-limiting. The facilities, areas, lines, machines, stations, fixtures, and elements can be referred to individually and collectively herein as assets 151, and/or as automated assets, and/or as digitized assets.

The automation data collected and/or generated by the AOS 10 can include condition state data for an asset 151, where a state, which may be referred to as a condition state or as a condition, as used herein, refers to a state of the asset, an object (such as a workpiece) being operated on by the asset, a condition, a status, a parameter, a position, or other property being monitored, measured and/or sensed. Non-limiting examples of condition states including cycle start time, cycle stop time, element start time, element travel, element stop time, position of an element or object, a dimensional measurement or parameter of an object which can include a dimensional measurement of a feature of an element E, a feature of a machine 16, a feature of a workpiece to which an operation is being performed by a machine 16 or an element E, a condition of one or more of an element E, machine 16 or workpiece, or a condition of the environment within the facility 14. A condition state could further include for example, operating conditions of an asset 151 such as on, off, open, closed, auto, manual, stalled, blocked, starved, traveling, stopped, faulted, OK, good, bad, in tolerance, out of tolerance, present, not present, extended, retracted, high, low, etc., and can include for example, a measure of a physical property such as chemistry, temperature, color, shape, position, dimensional conditions such as size, surface finish, thread form, a functional parameter such as voltage, current, torque, pressure, force, etc., such that it would be understood that the terms state, condition, condition state and/or parameter as describing inputs to the AOS 10 are intended to be defined broadly.

The predetermined order of operations performed in an operating cycle 15 can be defined by a sequence of operations 39 defined for that machine 16 by the controller L controlling the machine 16. The machine 16 would, in operation, repeatedly perform one or more operations OP comprising the sequence of operations 39 under the control of the controller L. The condition state data collected during performance of each operating cycle 15 of the operations OP in the sequence of operations 39, including, for example, one or more of a cycle start time, a cycle stop time, an element start time, an element stop time, etc., can be used by the machine controller L, the facility server L3, and/or the enterprise server L4 to calculate an actual cycle time for the performance of each operation OP by the asset 151 performing the operation OP, where in a preferred example the actual cycle time is determined in real time. The operating cycle times can be collected and stored in an AOS memory 90, as automation data for use in populating display templates 137 to generate automation data displays 138 for display on a display screen 74 of a user device U, which in a non-limiting example, can be configured as a user device U shown in FIG. 29.

For illustrative purposes and by way of non-limiting example, an enterprise 12 may be a production enterprise including a plurality of manufacturing and/or assembly facilities 14 which may be co-located within the production enterprise 12. In another example, each of the facilities 14 may be a stand-alone factory which may be geographically separated from each other and in communication with each other and the enterprise server L4, for example, via the network 80. At least one of the facilities 14, for illustrative purposes, includes a facility server L3 which is in communication with multiple systems SY operating in the facility 14. In the example shown, one of the systems SY includes manufacturing and/or assembly operations consisting of multiple machines 16.

Another of the systems SY in the facility 14 can be a facility management system, which may be referred to herein as a facility infrastructure system SY, for monitoring, measuring and/or controlling various factors of the infrastructure and operating environment of facility 14, such as electrical power supply provided to the various machines 16, water supply provided to hydraulic and/or coolant systems within the facility 14 and/or coolant systems related to the machines 16, compressed air supply provided within the facility 14, for example, to pneumatic systems of the machines 16 and/or to pneumatically operated elements E, the ambient temperature of a machine environment, the ambient humidity of a machine environment, etc. It would be understood that variability in each of the electrical power supply, water supply, and compressed air supply, ambient temperature, and ambient humidity could affect the operation, efficiency and downtime of one or more of the machines 16 and/or elements E, and as such, measurement of one or more of these system parameters, contemporaneously with operation of the machines 16, would provide parameter data which can be associated in real time with the automation data collected from the automated assets including the machines 16, to be used in conjunction with the automation data to analyze causes of variability in the operating cycle times of operations OP performed by the automated assets 151. In one example, the infrastructure and/or parameter data can be measured and outputted as analog data 167, which is saved to the AOS memory 90 and associated in real time by the enterprise server L4 with the automated data collected by the facility and machine controllers L3, L, for use in populating display templates 137 to generate automation data displays 138 for display on a display screen 74 of a user device U. The example is non-limiting, and it would be understood that the automation data collected from the automated assets 151 can include digital data and analog data, such that the term automation data, as used herein, can include both digital data and analog data.

Referring to the figures, AOS 10 can further include one or more user devices U in communication with the enterprise 12, via a wired connection or a wireless connection, for example, via a network 80. By way of non-limiting example, a user device U can be a computing device such as a personal computer, tablet, laptop, smart phone, personal digital assistant, or other personal computing device for viewing information including data related to and/or provided by the enterprise 12 via the AOS 10. The user device U can include a user interface 74 such as a touch screen for viewing automation data displays 138 generated by the AOS 10, and for interacting, via a user input 153 to the display screen 74, with the automation data displays 138 and displayed information and automation data. The user interface 74 can also be referred to herein as a display screen, a touch screen, and/or as a graphical user interface (GUI). In one example, the user device U can simultaneously display a plurality of automation data displays 138 on the display screen 74 of the user device U, where each of the automation data displays 138 can be manipulated, for example, zoomed in and out and/or panned, collapsed and/or expanded, activated to display associated text, and as further illustrated by FIGS. 1-6, by a user input 153 to the display screen 74.

The user device includes a processor 76 and memory 78, some of which is computer-readable tangible, non-transitory memory arranged on a printed circuit board or otherwise available to the processor 76. The memory 78 may include, by way of example, sufficient read only memory (ROM), optical memory, flash or other solid-state memory, and the like. Transitory memory such as random access memory (RAM) and electrically-erasable programmable read-only memory (EEPROM) may also be included, along with other required circuitry (not shown), including but not limited to a high-speed clock, location sensing circuitry, analog-to-digital (A/D) circuitry, digital-to-analog (D/A) circuitry, a digital signal processor, and any necessary input/output (I/O) devices and other signal conditioning and/or buffer circuitry. The user device U can include a connector port 72 for connecting the user device to another device (not shown). The user device U includes a communications interface which can be a wireless or wired interface, for connection of the user device U to the network 80 for communication with one or more of the controllers and/or the servers L, another of the user devices U, and/or the AOS data storage memory 90. The user device U includes a graphical user interface (GUI) 74, which in a preferred example is a graphical touch screen, such that a user can provide user inputs 153 to the user device U, including commands, via the touch screen 74 and/or standard tool bars 82. The graphical user interface 74 may also be referred to herein as a display screen, a touch screen and/or as a user interface 74. Non-limiting examples of user inputs 153 include stylus and/or touch gestures applied to the display screen 74 including one or more of tap, double tap, drag, slide, hold/press, swipe, pinch, and spread gestures, for manipulating the automation data display 138. Non-limiting examples of user inputs 153 can further include one or more inputs via a keyboard, touchpad, trackpad, trackball, and/or mouse in communication with the user device U and/or the display screen 74 including, for example, point, point and click, click and drag, scroll, key stroke inputs.

FIGS. 1-26 show examples of automation data displays 138 which can be generated by a server L of the AOS, for display on a display screen 74 of a user device U, by populating one or more display templates 137 with data stored within the AOS 10. Methods of dynamically modifying the automation data displays 138 shown on the display screen 74 in response to user input received by the display screen 74 are illustrated by FIGS. 1-26. In the examples shown in the figures, the display screen 74 shows one or more automation data displays 138, which are generated by populating a display template 137 with data such as the automation data collected from the enterprise 12 and stored in the AOS memory 90. In an illustrative example, the automation data display 138, such as any one of the automation data displays 138 shown in the figures, can be generated by the facility server L3 by populating a display template 137 with automation data collected from a facility 14, a machine 16, an element E, a station ST, and/or infrastructure or environmental data collected from a system SY, where the data is collected and stored to a memory, such as data memory storage 90, for use by the server L in generating the automation data display 138. A plurality of display templates 137 can be stored on data memory storage 90 and retrieved by the facility server L3 to generate a corresponding automation data display 138 in real time. The data memory storage 90 can be a standalone enterprise memory storage 90, in communication with the enterprise 12 via a network 80, and/or can comprise distributed memory storage within the enterprise 12. A plurality of automation data displays 138 generated from corresponding data templates 137 are illustrated in FIGS. 1-26, including, for example, a heartbeat cycle state display 11, a sequence of operations (SOP) cycle state display 13, a multiple asset display 65, an asset tree display 152 (also referred to herein as an object tree display), a cycle status display 155, and an analog display 165.

The automation data, including analog parameter data, is collected and stored to the data storage memory 90 in real time, such that the server, e.g., the facility server L3 in the present example, can populate a display template 137 to generate an automation data display 138 in real time. The term "in real time" as used herein refers to a level of responsiveness by computing equipment included in the enterprise 12, including, for example, servers and controllers L, data storage memory 90, user devices U, etc., which is perceived by a user as sufficiently immediate such that the response of the computing equipment in collecting and displaying data in an automation data display 138 is without delay, e.g., is perceived to occur at substantially the same time and at the same rate as the time and rate of the data being displayed. In the present example, data is collected from the automated assets and systems SY in real time, e.g., without delay, such that the data can be populated into a display template 137 and displayed as an automation data display 138 on a user device U in real time, e.g., such that the data displayed on the automation data display 138 is displayed sufficiently immediate to the generation of that data by the originating source (for example, by a sensor S), that a user can view, for example, via a display screen 74 of a user device U, the data displayed in an automation data display 138 immediate to the time the data is generated and/or immediate to the time the event from which the data is generated occurs, for example, immediate to the time an operation is performed by a machine 16. Data, when collected and stored in the data memory storage 90, can be associated in the data memory storage 90, for example, in a data matrix provided for that purpose, with identifying information, which can include the source of the data such as the identification of the sensor generating the data, the condition state and/or the parameter represented by the data, e.g., the data feature 141 corresponding to the data, one or more of the operation Op, machine 16, element E, facility 14, and/or system SY associated with the data, and a data time associated with the data. The data time associated with the data can be one of a time the data was generated, e.g., the time the data was sensed by a machine, element, fixture, station, sensor, etc. which is generating the data, and a time the data was stored to the data memory storage. In real time, the time the data was sensed and the time the data was stored should be substantially equal as these events are immediate to each other in the real time system described herein. The example is non-limiting, and it would be understood that another time, such as a timestamp applied by a controller or server, can be used as the data time. In one example, a data feature 141 can be displayed as a differentiated data feature 142, differentiated, for example, by appearance (color, shading, hatching, shape, outlining, etc.) to indicate a condition state associated with the data feature 141. In a non-limiting example, illustrated by the legend shown in FIG. 26, different colors and/or hatchings can be associated with different condition states to visually differentiate a data feature 141 such as a cycle status bar 158, a heartbeat cycle bar 15, an actual cycle time indicator 31, a cycle state 19, a condition state message 163, etc., and as described herein and illustrated by the figures.

Referring again to the figures, FIGS. 1-26 and 30 are described herein to illustrate methods for displaying automation data in real time, using the Automation Operating System (AOS) shown in FIGS. 27-29. In one example, one or more operating cycles 15 of one or more operations OP performed by an asset 151 are simultaneously displayed concurrent with and relative to an actual timeline display 33 displaying an actual (clock) time 33 corresponding to the operating cycle 15, on a display screen 74 of a user device U. In response to a user input 153 to the display screen 74, the automation data display 138 including the actual timeline display 33 can be dynamically manipulated to display varying levels of detail of selected operating cycles 15 of the automation data, and such that the variability between the displayed operations OP and/or operating cycles 15 can be viewed and analyzed relative to the actual clock time 37 associated with each operating cycle 15. In one example, the one or more respective operating cycles 15 of one or more performed by a plurality of assets 151 can be simultaneously displayed on the display screen 74, and in response to a user input 153 to the display screen 74, the automation data display 138 can be dynamically manipulated to display varying numbers of assets 151, varying numbers of operating cycles, and varying levels of detail of the selected operating cycles 15, displayed concurrent with the actual timeline 33 and/or clock time 37 associated with each of the operating cycles 15, and such that the variability between the assets and the operating cycles 15 in real time and/or over the time period shown by the timeline 33 can be viewed and analyzed. In one example, a combination of automation data collected from one or more assets and analog data collected, for example, from a system or element related to the assets can be simultaneously displayed on the display screen, and in response to a user input to the display screen, the automation data display 138 can be dynamically manipulated to display varying numbers of operating cycles 15 of the assets and the associated analog data collected in real time with the performance of the operating cycles 15, such that patterns and/or correlations between the analog data and automation data over a displayed timeline 33 can be viewed and analyzed.

Referring to FIG. 1, shown is a user device U including a user interface 74 for displaying one or more automation data displays 138, where each automation data display 138 is generated in real time by populating a corresponding data template 137 with automation data, for example, retrieved from an AOS memory 90. The user interface 74 can also be referred to herein as a display screen 74. In one example, user device U is in communication with one or more of an enterprise server L4, or a facility or machine controller L3, L, in communication with the AOS memory, such that, when a user input 153 is inputted to the display screen 74 of the user device U, the user input 153 actuates a modification of automation data display 138 and/or the display of additional information such as another automation data display 138, an information box 61, or the like, via the display screen 74. In the example shown in FIG. 1, an example of an initial display screen 74 presented to a user can include a display menu 150, a legend icon 156, a toolbar 82, and an option menu 164. The display menu 150 includes icons which can be selected by a user input 153 to actuate the display of a type of automation data display 138 associated with the icon. In the example shown, the display menu 150 includes an object tree icon 154A for actuating an object tree display 152, a dashboard icon 154B for actuating a dashboard display, a cycles icon 154C for actuating a selected one of a plurality of cycle displays including a cycle status display 155, a heartbeat cycle state display 11, and an SOP cycle state display 13, and a messages icon 154D for actuating a condition state message display 162. An object tree 152 can also be referred to herein as an asset tree 152.

In the example shown in FIG. 1, a user input 153, such as a touch tap or mouse click, has been inputted to the object tree icon 154A of the display screen 74, to actuate the display of an asset tree 152. In a non-limiting example, the asset tree 152 is initially displayed on the display screen 74 as shown in FIG. 1, displaying the enterprise asset 12, which in the example shown includes assets identified in FIG. 1 as facilities 14A and 14B. In the example shown of the asset tree display 152, each of the assets 151 is shown associated with a corresponding expand/collapse icon and a corresponding selection box, each of which can be used to actuate the screen display 74 to modify the information and/or data displayed on the screen display 74.

Figure 2:
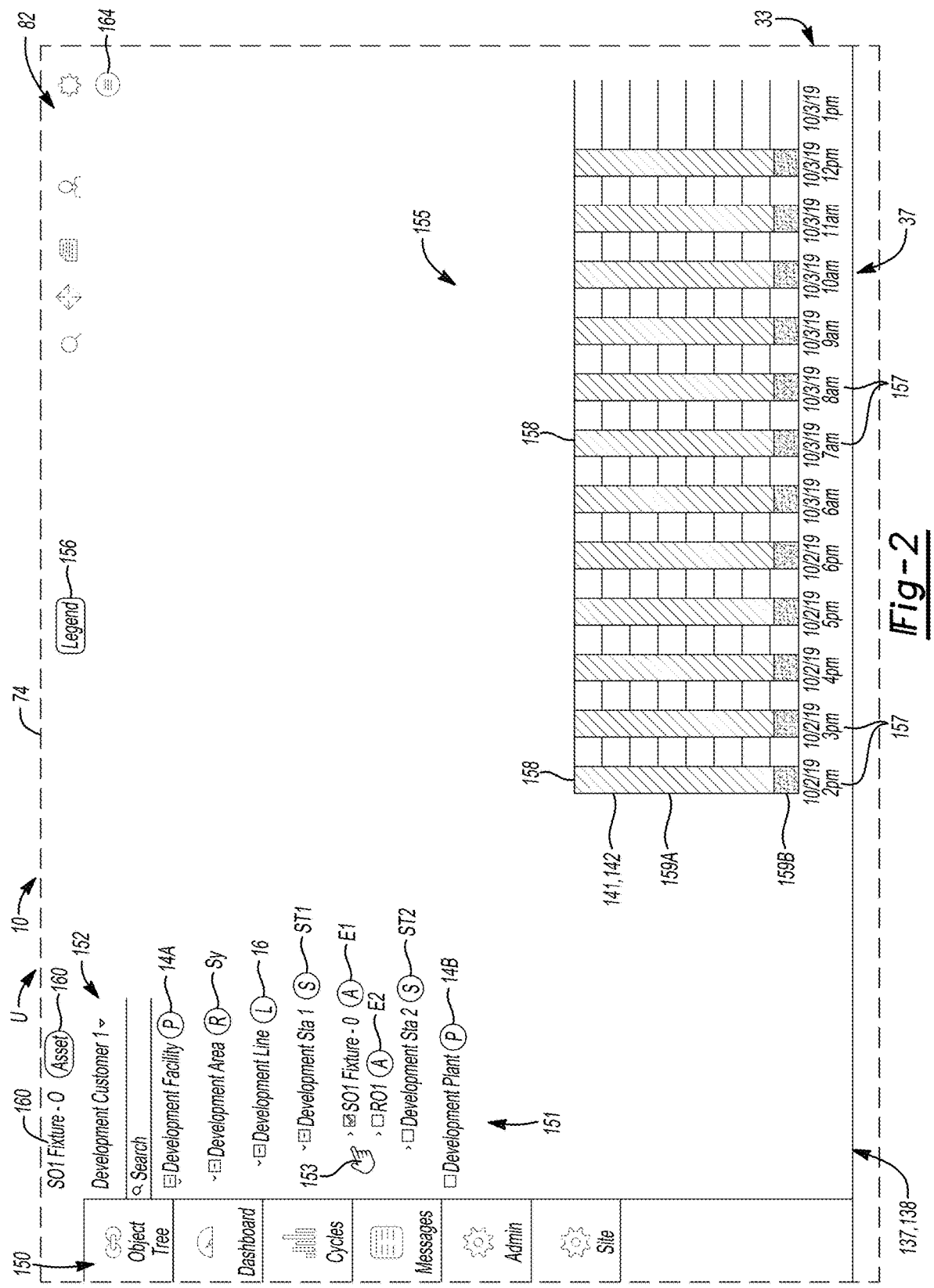
FIG. 2 is a schematic example representation of an automation data display generated by the system shown in FIG. 27, displaying an expanded asset tree and a cycle status display for an asset selected from the asset tree by a user input to the automation data display.

In the example shown in FIG. 2 a user input 153 is inputted to the display screen 74 to the expand icon corresponding to the facility 14A, actuating the AOS 10 to display a next level of assets 151 of the facility 14A, which as shown in FIG. 2 includes a system SY. In the example shown in FIG. 2 is a user input 153 is inputted to the display screen 74 to the expand icon corresponding to the system SY, actuating the display of a next level of assets 151 of the system SY, which as shown in FIG. 2 includes a machine 16. In the example shown in FIG. 2 a user input 153 is inputted to the display screen 74 to the expand icon corresponding to the machine 16, actuating the display of a next level of assets 151 of the machine 16, which as shown in FIG. 2 includes a first station ST1 and a second station ST2. In the example shown in FIG. 2 a user input 153 is inputted to the expand icon corresponding to the first station ST1, actuating the display of a next level of assets 151 of the first station ST1, which as shown in FIG. 2 includes a first element E1 and a second element E2. In the example shown, E1 is identified as a fixture having an asset description of "S01 Fixture" and E2 is identified as a station element having an asset description of "R01" in the asset tree 152.

Figure 3:
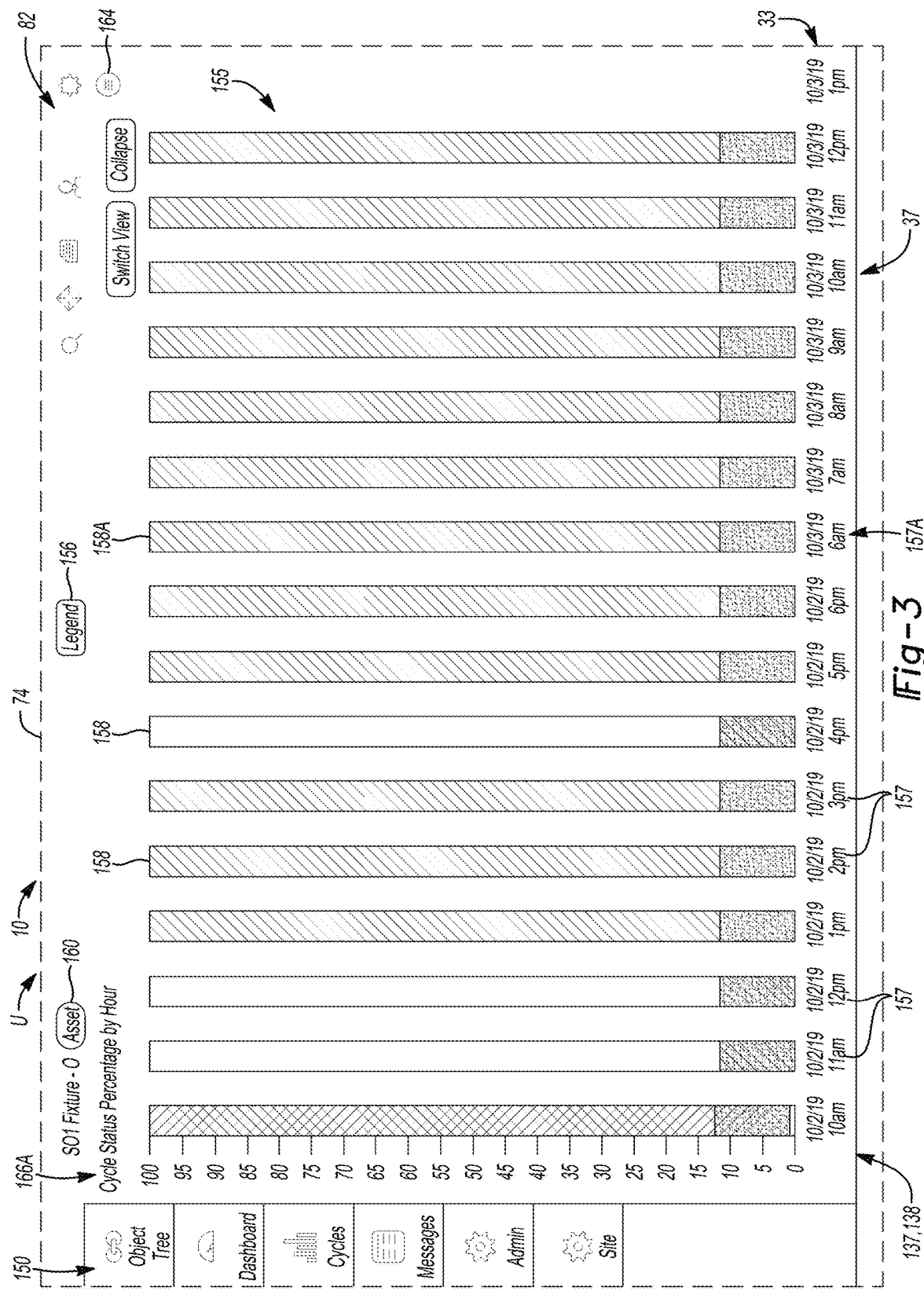
FIG. 3 is a schematic example representation of an automation data display generated by the system shown in FIG. 27, displaying an expanded view of the cycle status display shown in FIG. 2.
Figure 6:
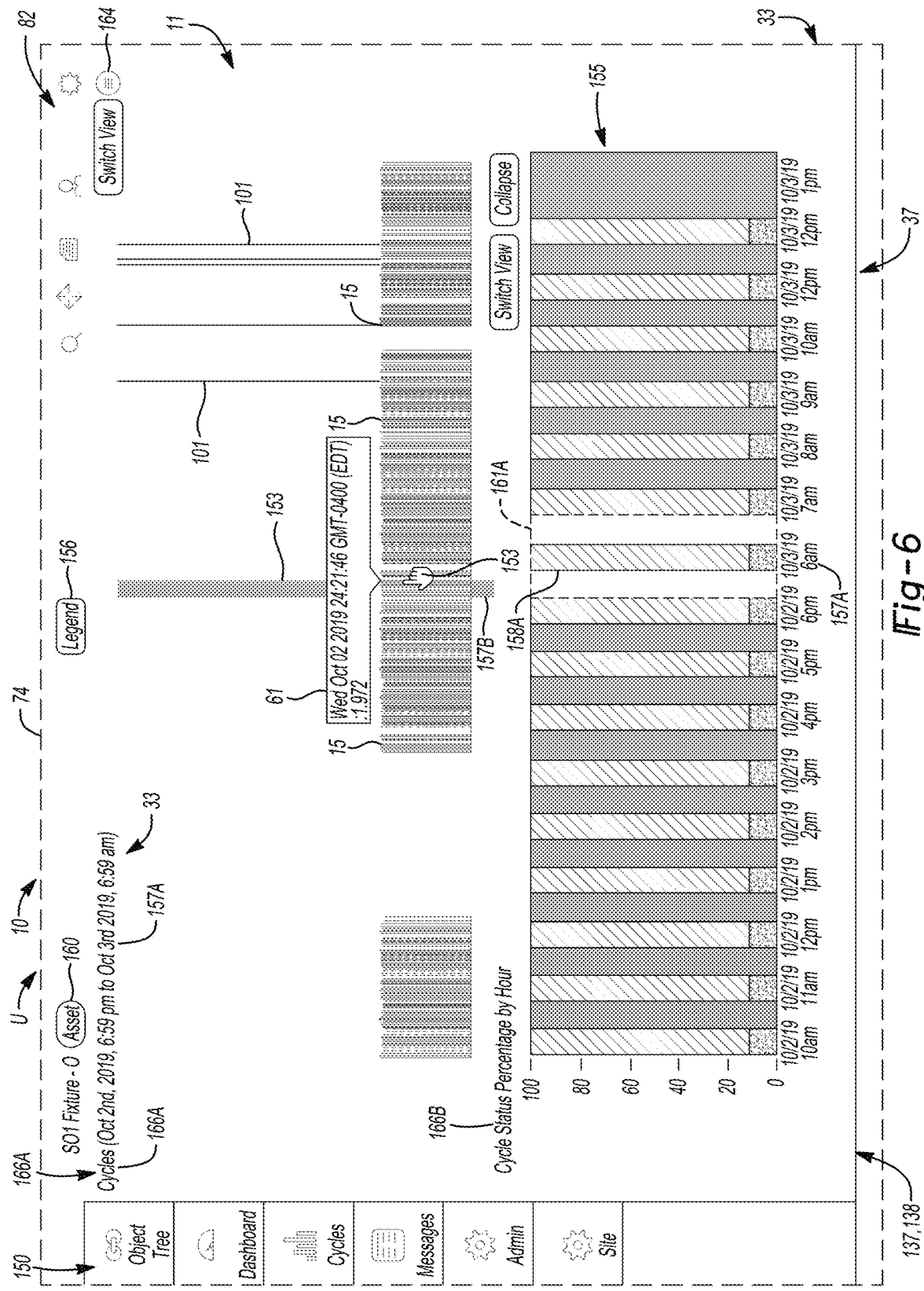
FIG. 6 is a schematic example representation of an automation data display generated by the system shown in FIG. 27, displaying the heartbeat cycle state and cycle status displays shown in FIG. 5 and concurrently displaying a user input selecting a time period including one or more heartbeat cycle bars.

In the example shown in FIG. 2, a user input 153 is inputted to the selection box corresponding to element E1, which auto-fills the selection boxes of the higher level assets 151 including the element E1, and further actuates the display screen 74, to generate and display a cycle status display 155 for the asset 151 selected in FIG. 6, which in the present example is element E1, identified in the asset tree 152 as "S01 Fixture". As shown in FIGS. 2 and 3, the display screen 74 progressively transitions to display the cycle status display 155 generated for the asset "S01 Fixture" and displays at 160 the selected asset 151, in the present example, "S01 Fixture," associated with the cycle status display 155 being generated. The cycle status display 155 is generated by populating a display template 137 corresponding to the cycle status display 155 in real time with data retrieved from the AOS memory 90. The data retrieved from the AOS 90 can include data retrieved in real time from the selected asset 160, which in the present example is element E1, the "S01 Fixture."

In the examples shown in FIGS. 2 and 3, the cycle status display 155 includes a plurality of cycle status bars 158, each representing the cumulative status of operating cycles completed by the selected asset 160 in a time period 157. In the present example, the time period 157 is one hour in duration, such that each cycle status bar represents the cumulative status of operating cycles performed in that hour by element E1. The cycle status bar 158 can also be referred to herein as a data feature 141, which in the present example is a differentiated data feature 142, having bar portions 159A, 159B which are differentiated, for example, by color, by hatching, and/or by a combination of these, to indicate a condition state of the percentage of total bars in that condition state for the respective one-hour time period 157. Referring to FIG. 26, shown is a legend 77 cross-referencing a condition state to the differentiator shown in the figures. In the specification, the differentiator may be indicated by a color, whereas in the figures, the differentiator may be indicated by a hatch pattern associated with the described color in the legend 77, to facilitate reproduction of the figures as black and white drawings. In the present example, the orange color of bar portion 159A indicates the percentage of total operating cycles 15 performed in that time period 157 which were completed over cycle, e.g., in an actual cycle time longer than the baseline cycle time, and the vermillion color of bar portion 159B indicates the percentage of total operating cycles 15 which were in a faulted condition during that time period 157, wherein the hatch patterns corresponding to each of the orange and vermillion colors are shown in legend 77 of FIG. 26. The example is illustrative, such that the cycle bar 158 could include portions 159 in other colors to indicate other condition state such as green for operating cycles performed with an acceptable range of the baseline cycle time, or orange for operating cycles which are alerted, which should be watched or investigated.

In the example shown in FIG. 3, a user input 153 is inputted to a "Collapse" icon included in the toolbar 82, which actuates the display screen 74 to transition to the display shown in FIG. 3, by collapsing the object tree 152 and increasing the number of time periods 157 and cycle status bars 158 which can be displayed in the display screen 74. In the example shown in FIG. 3, a parameter descriptor 166 is displayed to identify the parameter shown in the automation data display 138. In the present example, a parameter descriptor 166A is displayed as "Cycle Status Percentage by Hour" identifying the automation data display 138 shown in FIG. 3 as a cycle status display 155.

In the example shown in FIG. 3, a user input 153 is inputted to the display screen 74 at status bar 158A, actuating the display screen to display an information box 61 including data and/or other information associated in the AOS memory 90 with the operating cycles 15 performed by the selected asset 151, e.g., performed by the S01 Fixture, during the selected time period 157A. In the example shown, the information box 61 includes a legend of the color codes and associated conditions, and reports the actual number of operating cycles 15 in each condition during the selected time period 157A. In the example shown, the information box 61 reports a total of 358 operating cycles performed by the S01 Fixture, e.g., the selected asset 160, during the one hour time period 157A including 319 over cycle time (orange) operating cycles (89%) and 39 faulted (red) operating cycles (11%).

Figure 4:
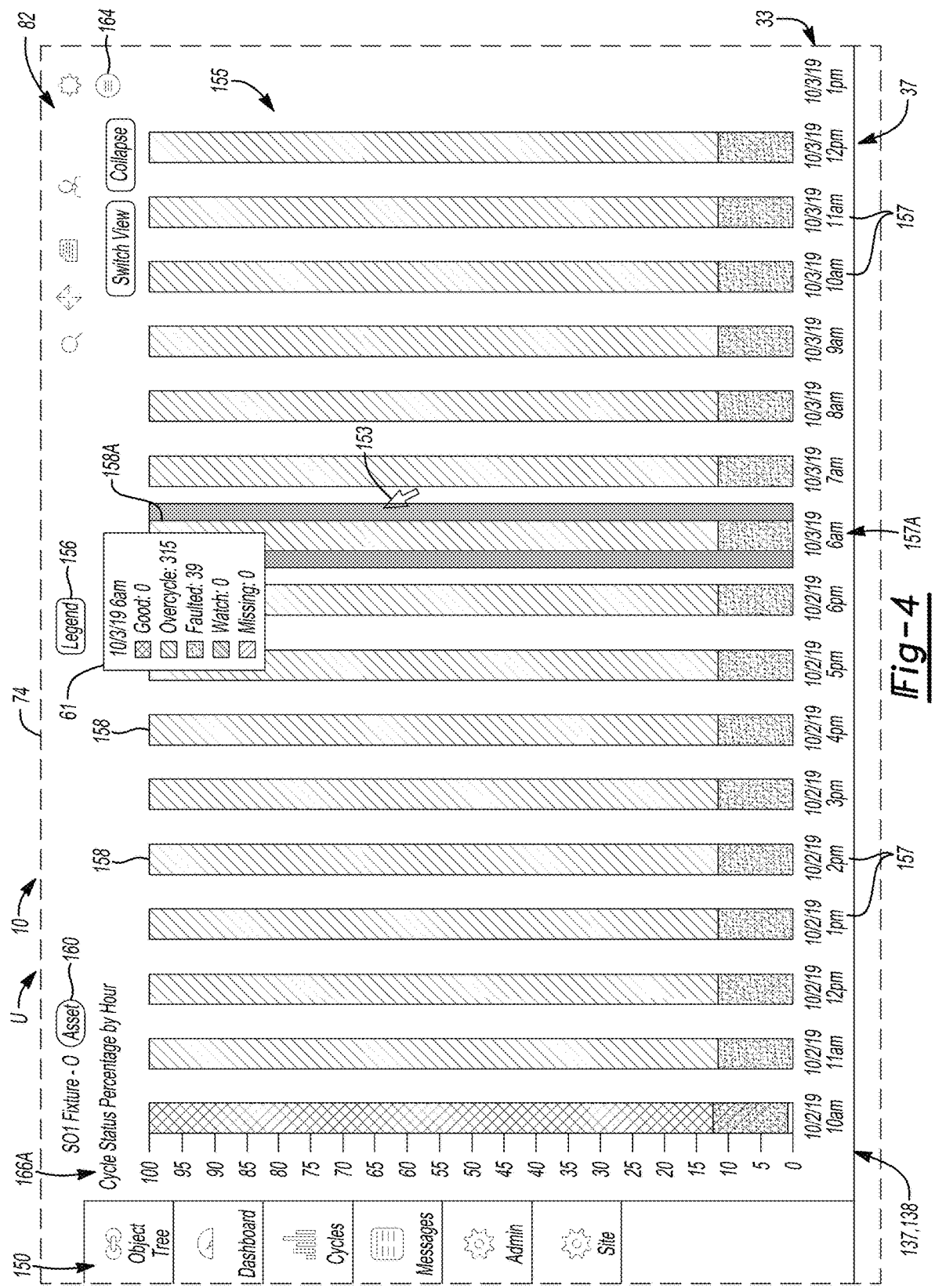
FIG. 4 is a schematic example representation of an automation data display generated by the system shown in FIG. 27, displaying a selected time period including a selected cycle status bar selected by a user input, concurrently displaying an information window activated by selection of the cycle status bar.
Figure 5:
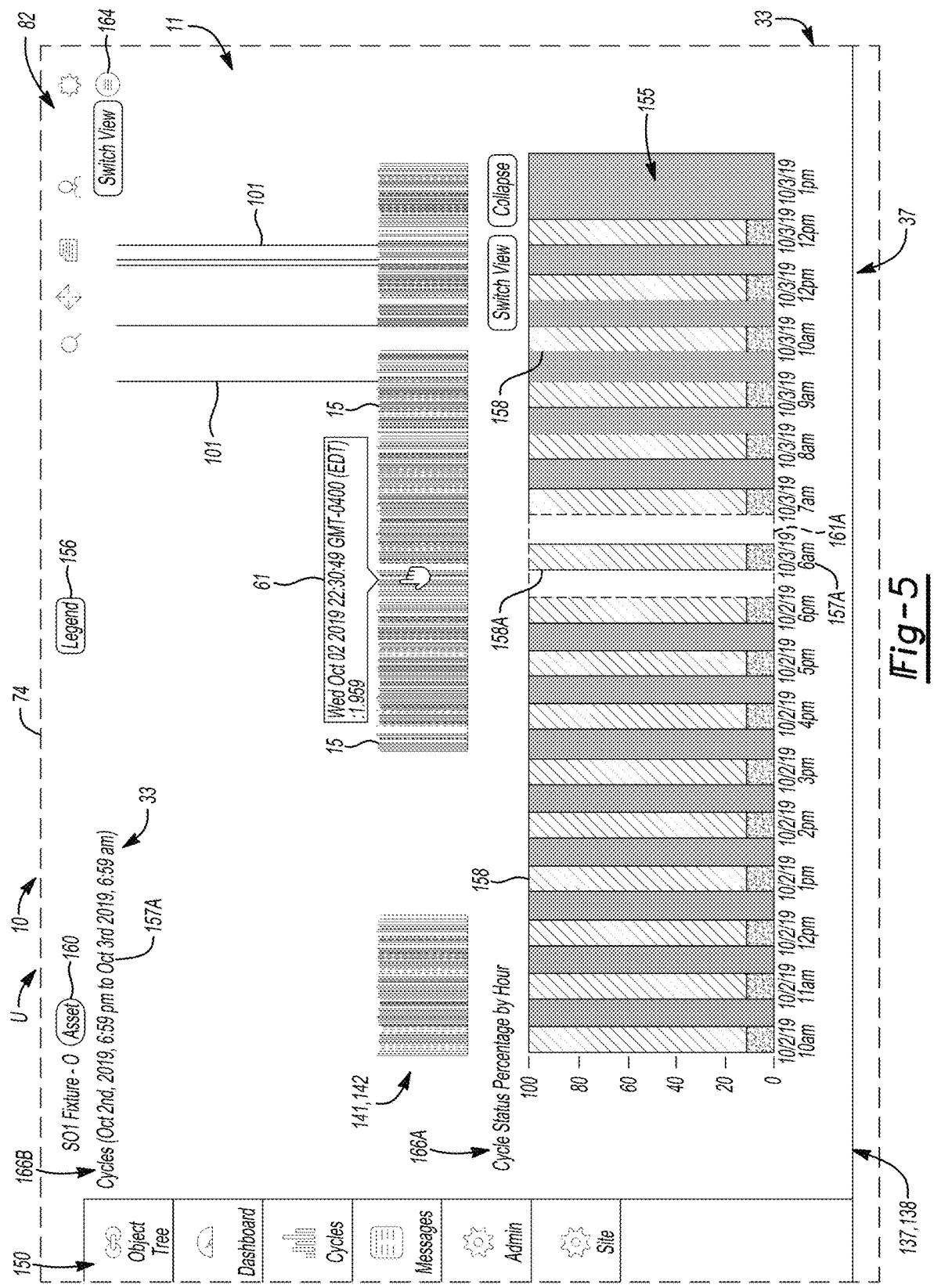
FIG. 5 is a schematic example representation of an automation data display generated by the system shown in FIG. 27, displaying a heartbeat cycle state display for the selected time period shown in FIG. 4, concurrently displaying an information window activated by a user input to one or more heartbeat cycle bars; concurrently displaying the cycle status display of FIG. 4 and an orientor for orienting the heartbeat cycle state display to the selected time period of the cycle status display.

In the example shown in FIGS. 4 and 5, the user input 153 is applied to the display screen 74 to select the cycle status bar 158A and time period 157A, for example, by a touch input such as a drag over or double tap, or by scrolling over the cycle status bar 158A, to actuate the screen display 74 to generate, as shown in FIG. 5, another automation data display 138 which is simultaneously displayed with the currently displayed cycle status display 155. In the example shown in FIG. 5, the second automation data display 138 is configured as a heartbeat cycle state display 11, also referred to herein as a heartbeat display 11, where each of the vertical bars in the heartbeat display 11 indicate the actual cycle time of an operating cycle 15 performed by the selected asset 160, e.g., by the S01 Fixture in the present example, during the selected time period 157A. As shown in FIG. 5, the heartbeat display 11 and the cycle status display 155 are displayed simultaneously, with the time period 157A displayed in the heartbeat display 11 oriented to the cycle status display 155 by an orienting feature 161A. In the present example, the orienting feature 161A is a white background surrounding the selected cycle status bar 158A, such that it is instantaneously visually apparent which operating cycles 15 are being displayed in the heartbeat display 11. The heartbeat display 11 includes a parameter descriptor 166B identifying the heartbeat display 11 with the identifier "Cycles" followed by the displayed time period 157A expressed in clock time.

In the example shown in FIG. 5, the cycle bars indicating each of the operating cycles 15 are data features 141 of the heartbeat display 11, and can be characterized as differentiated data features 142, where the condition state of each operating cycle 15 is indicated by the displayed color of the corresponding cycle bar. Consistent color coding can be used, for example, for easy recognition by a user/observer of the display screen 74, such that in the present example, an orange cycle bar indicates an over cycle operating cycle 15, and a red cycle bar indicates a faulted operating cycle 15. In one example, a digital marker 101 can be associated with an operating cycle 15, displayed in the heartbeat display 11 as a vertical line, indicating additional information, such as observations or corrective actions related to the associated operating cycle 15, has been stored in the AOS memory 90 associated with the respective operative cycle 15. In one example, a user input 153 applied to a digital marker 101 actuates the display screen 74 to display the additional information, for example, in an information box 61.

In the example shown in FIG. 6, a user input 153 is inputted to the display screen 74 by selecting one or more of the operating cycles 15 shown in the heartbeat display 11. In the present example, a group of operating cycles 15 performed during a time period 157B are selected by the user input 153, actuating the display screen 74 to display third and fourth automation data displays 138 simultaneously with the heartbeat display 11 and the cycle status display 155. As shown in FIGS. 7-13, the third automation data display 138 is configured as a sequence of operations (SOP) cycle state display 13, also referred to herein as a SOP cycle state display 13, and the fourth automation data display 138 is configured as a condition state message display 163 which is overlaid on the SOP cycle state display 13. In the examples shown in FIGS. 7-13, the time period 157A displayed in the heartbeat display 11 is oriented to the cycle status display 155 by the orienting feature 161A, and the time period 157B, which is a subset of the time period 157A, is oriented to the SOP cycle state display 13 and the condition state message display 162 by an orienting feature 161B. In the present example, the orienting feature 161B is a white background surrounding the selected operating cycles 15 selected in the heartbeat display 11, such that it is instantaneously visually apparent which operating cycles 15 are being displayed in SOP cycle state display 13 and the condition state message display 162. Additionally, the clock time within the time period 157B is indicated in a horizontal timeline along the top (as viewed on the page) of the SOP cycle state display 13 and overlaid condition state message display 162, to orient the displayed operating cycle 15 to the selected time period 157B.

Figure 7:
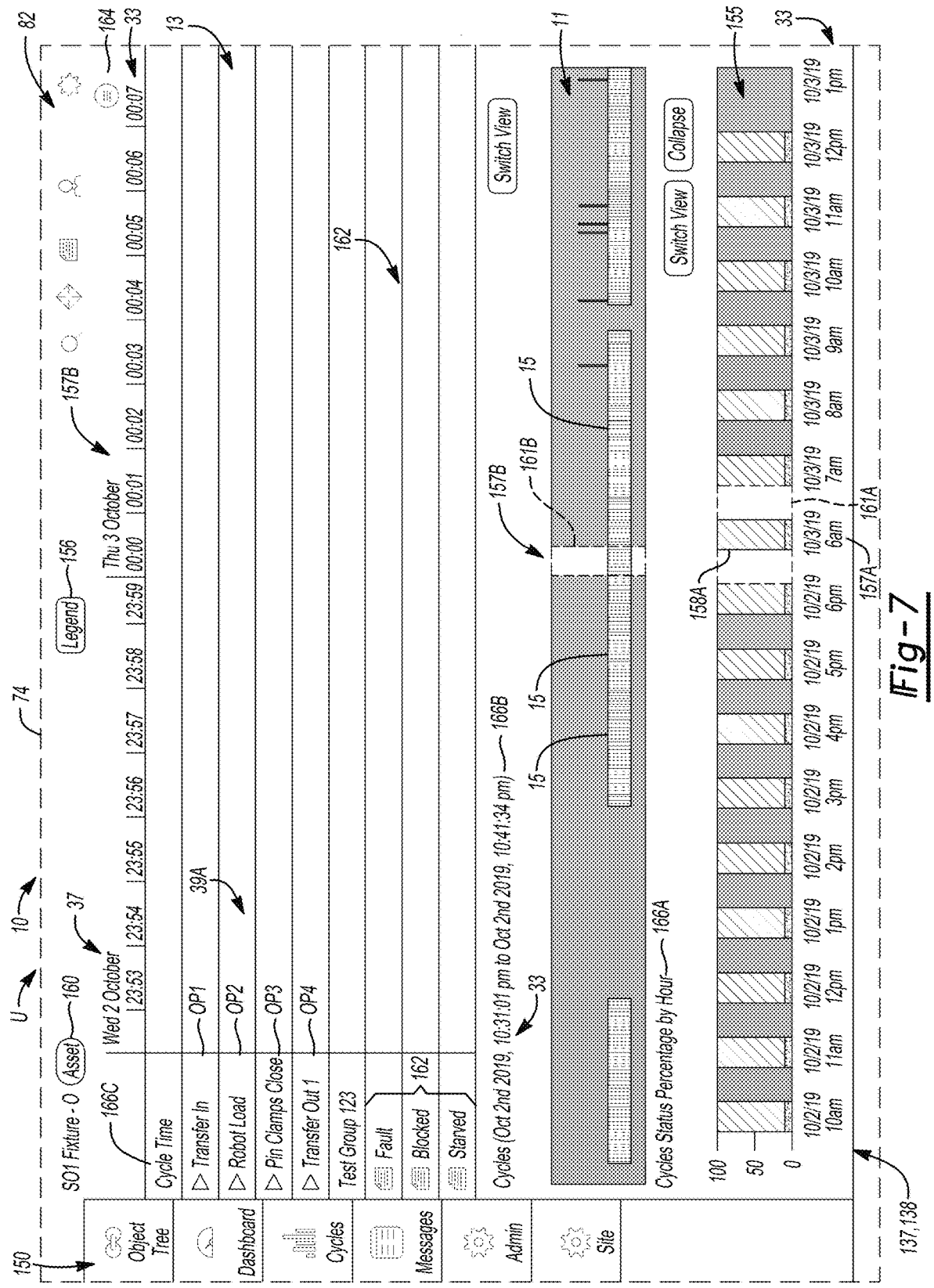
FIG. 7 is a schematic example representation of an automation data display generated by the system shown in FIG. 27, displaying the heartbeat cycle state and cycle status displays shown in FIG. 6 and concurrently displaying a sequence of operations (SOP) performed by the selected asset with an SOP timeline corresponding to the time period of the selected heartbeat cycle bars, the heartbeat cycle state display including an orientor for orienting the selected time of the heartbeat cycle state display to the SOP timeline.
Figure 8:
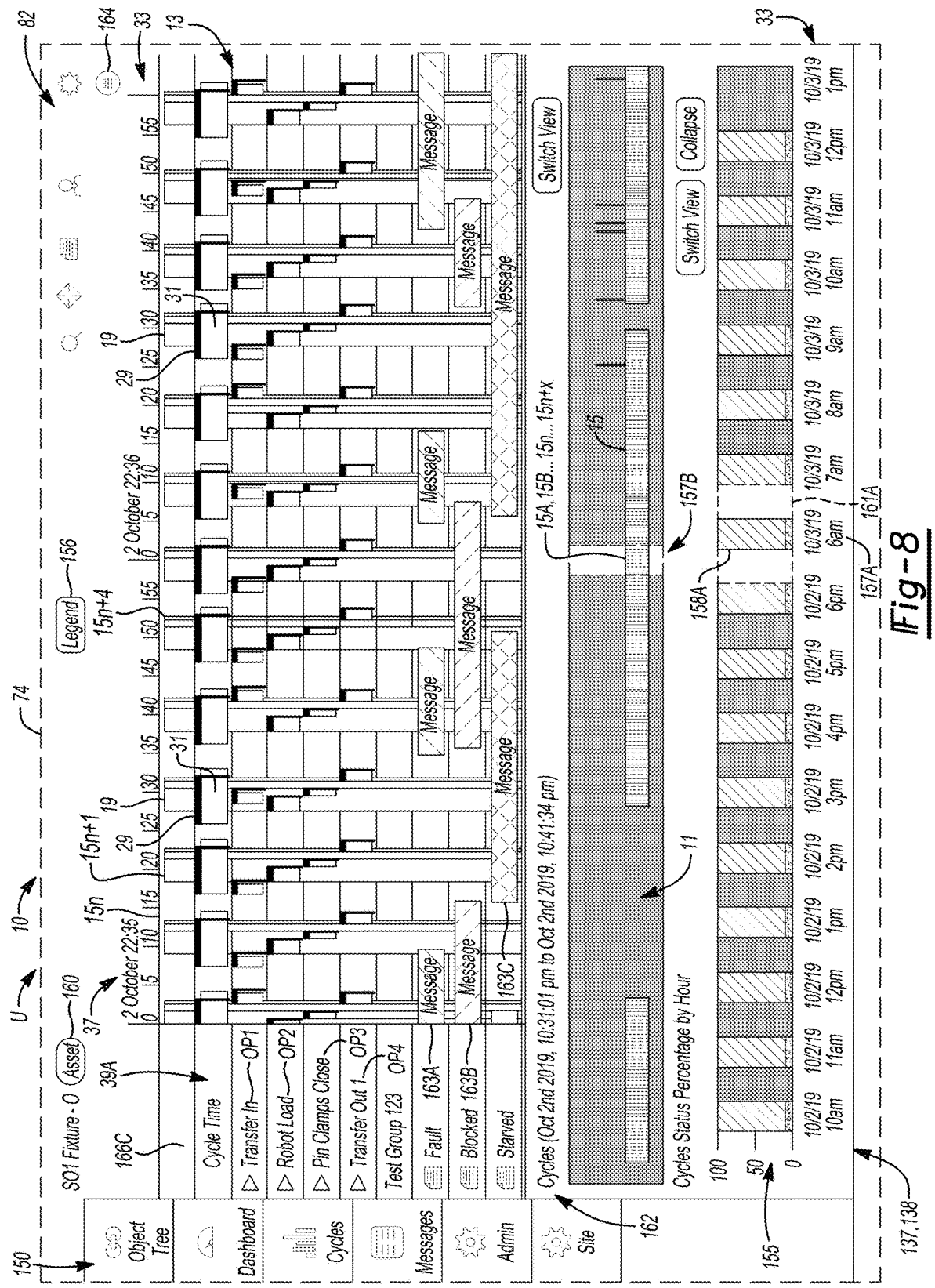
FIG. 8 is a schematic example representation of an automation data display generated by the system shown in FIG. 27, displaying the heartbeat cycle state display, the cycle status display, and the SOP and SOP timeline as shown in FIG. 7 and concurrently displaying a baseline and actual cycle time indicators, cycle states and condition state messages for each cycle of a plurality of cycles of the sequence of operations performed by the selected asset within the time period of the selected heartbeat cycle bars.

In the example shown in FIG. 7, in response to the user input 153 selecting a time period 157B, a third display template 137 corresponding to the SOP state cycle display 13 is populated with data associated with the selected asset 160, e.g., E1, also described in the example as the "S01 Fixture", including a sequence of operations (SOP) 39A performed by the selected asset E1, where the SOP 39A is performed during each operating cycle 15 performed by the selected asset E1. In the example shown, the SOP 39A includes operations OP1, OP2, OP3, OP4 performed sequentially in the order defined by the SOP 39A shown in the SOP cycle display 13, where the operations OP1, OP2, OP3, OP4 are performed sequentially during each operating cycle 15 performed by the selected asset E1. As shown in FIG. 8 and in additional detail in FIGS. 9 and 10, the SOP cycle state display 13 is populated with a baseline cycle time indicator 29 and an actual cycle time indicator 31 for each of the operations OP1, OP2, OP3 and OP4 in the SOP 39A performed by the selected asset 160, for each of the operating cycles 15 performed by the selected asset 160. The SOP cycle state display 13 is additionally populated with a baseline cycle time indicator 29 and an actual cycle time indicator 31 for the cumulative cycle time taken by the selected asset 160 to complete the SOP 39A, for each operating cycle 15 performed by the selected asset 160, e.g., by the S01 Fixture in the present example. In the present example, a parameter descriptor 166C is displayed as "Cycle Time" identifying the cycle display 13 shown in FIG. 7 as a SOP cycle state display 13.

Figure 10:
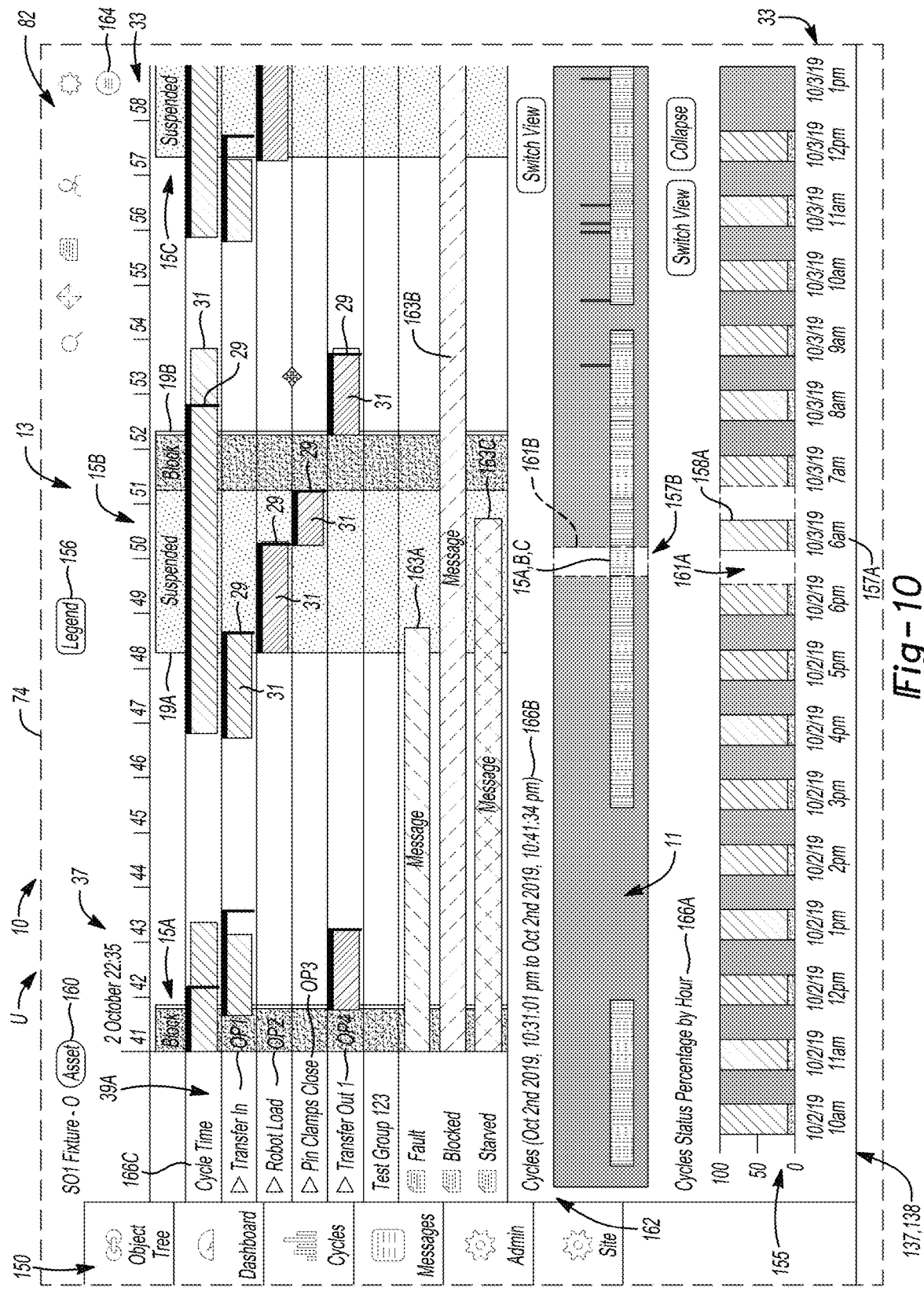
FIG. 10 is a schematic example representation of an automation data display generated by the system shown in FIG. 27, displaying the automation data display shown in FIG. 9, with the SOP cycle state display further zoomed in, in response to a user input to the user interface.
Figure 11:
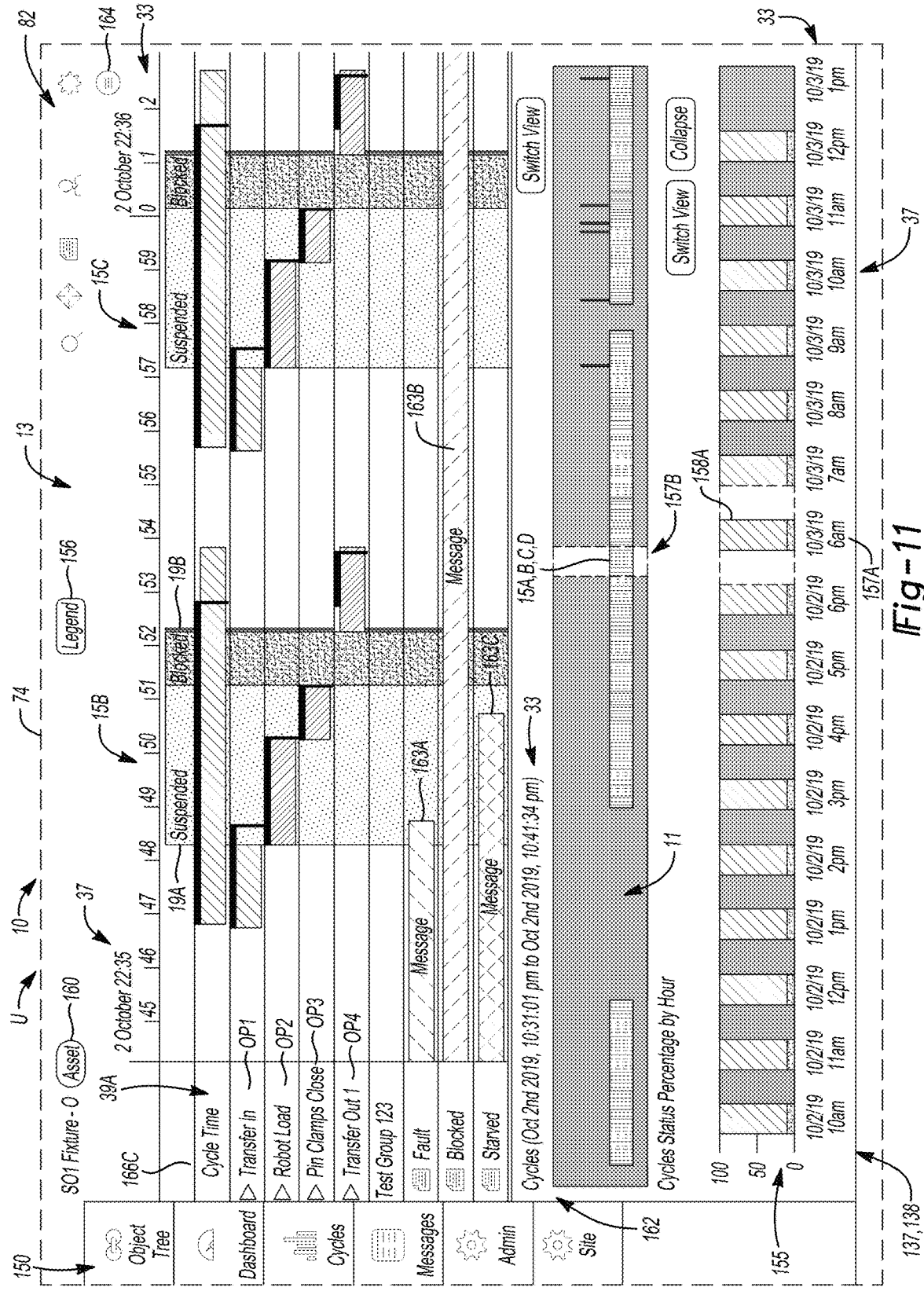
FIG. 11 is a schematic example representation of an automation data display generated by the system shown in FIG. 27, displaying the automation data display shown in FIG. 10, with the SOP cycle state display panned right along the SOP timeline, in response to a user input to the user interface.
Figure 12:
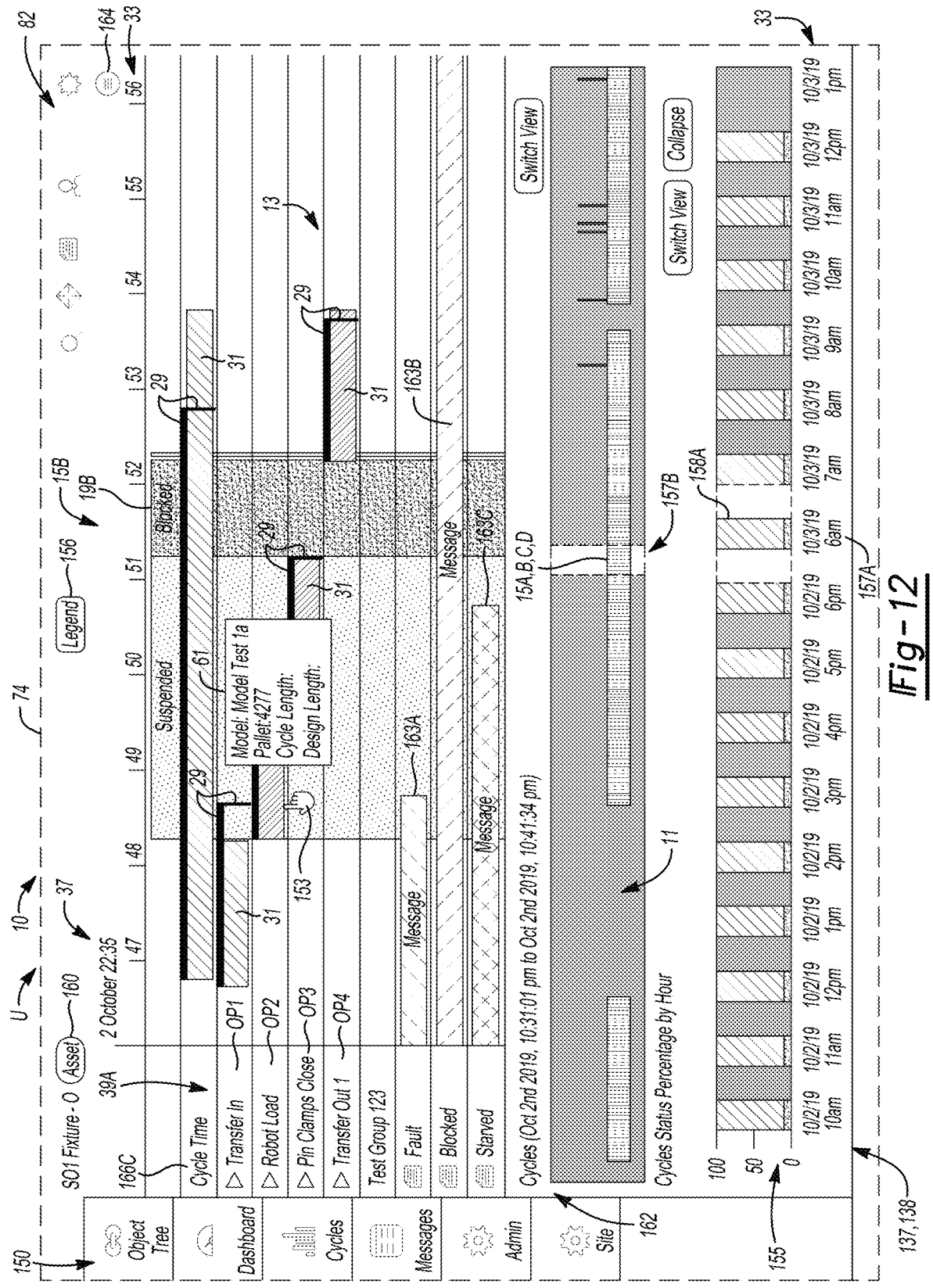
FIG. 12 is a schematic example representation of an automation data display generated by the system shown in FIG. 27, displaying the automation data display shown in FIG. 11, with the SOP cycle state display zoomed to display a single cycle of the SOP, in response to a user input to the user interface, and concurrently displaying an information window of a cycle of an operation of the SOP displayed in response to a user input to the user interface.

As shown in FIGS. 8-13, a respective baseline cycle time indicator 29 is displayed and associated with each respective actual cycle time indicator 31. The baseline cycle time indicator 29, shown in a non-limiting example as a horizontal blue bar extends for a duration of time defining a baseline cycle time for the operation OP and/or the SOP 39 with which the baseline cycle time indicator 29 is associated, such that differences in the horizontal lengths of the baseline cycle time indicator 29 and the actual cycle time indicator 31 provide a visual display of whether the actual cycle time is greater than, equal to, or less than the baseline cycle time, for quick visual identification of deterioration and/or improvement in actual cycle time relative to baseline cycle time. The baseline cycle time indicator 29 terminates in a vertical blue line which overlays the actual cycle time indicator 31 with which the baseline cycle time indicator 29 is associated, providing an additional visual indicator to determine variation of the actual cycle time relative to the baseline cycle time. In the examples shown in FIGS. 8-13, and in detail in FIGS. 9-12, each of the actual cycle time indicators 31 is a differentiated data feature 142, differentiated by a color to indicate a condition state of the cycle time of the respective operation OP and/or the respective SOP 39A associated with the respective actual cycle time indicator 31, as another quick visual identifier of deterioration and/or improvement in actual cycle time relative to baseline cycle time. For example, referring to FIG. 9, an actual cycle time indicator 31 colored green identifies an actual cycle time which is equal to (or within an acceptable variation from) the baseline cycle time; an actual cycle time indicator 31 colored orange identifies an actual cycle time which varies more than an acceptable time from the baseline cycle time, where the variance may indicate an actual cycle time which is greater than or less than the baseline cycle, either condition potentially indicating a condition requiring attention; and an actual cycle time indicator 31 colored red identifies an actual cycle time for an operation which has been faulted. As shown in FIG. 12, a user input 153 applied to a selected cycle time indicator 29, 31 actuates the SOP cycle state display 13 to display an information box 61, showing additional information related to the selected operation OP and operating cycle. In the present example, the information box 61 displayed for the selected operating cycle 15B of operation OP2 performed in the SOP 39A by the selected asset 160, e.g., by the S01 Fixture, displays additional information such as a model identifier of the S01 Fixture, a pallet number associated with the S01 fixture, the actual cycle time visually represented by the selected actual cycle time indicator 31, and the design intent cycle time visually represented by the baseline cycle time indicator 29 associated with the selected actual cycle time indicator 31.

In the example shown in FIG. 7, in response to the user input 153 selecting a time period 157B, a fourth display template 137 corresponding to the condition state message display 162 is populated with message labels associated with the condition states observed for the selected asset 160, e.g., E1, also described in the example as the "S01 Fixture", including condition state labels of "Faulted", "Blocked" and "Starved" where the displayed messages 163 associated with each of these are differentiated data features 142 of the condition state message display 162. In the example shown in FIGS. 8-13, the "Faulted" messages 163A are differentiated by being displayed in a rust colored display window, the "Blocked" messages 163B are differentiated by a blue colored display window, and the "Starved" messages are differentiated by a gold colored display window. As shown in FIGS. 8-17, each message display window 163 extends across the one or more operating cycles 15 for which the message shown in the display window 163 is effective. For example, the message displayed in a Faulted message display window 163A could indicate "power cut to machine" where the message display window 163A is displayed extending over multiple operating cycles 15 affected by the power loss to the machine 16 including the affected asset 160, in the present example, the S01 Fixture.

Figure 9:
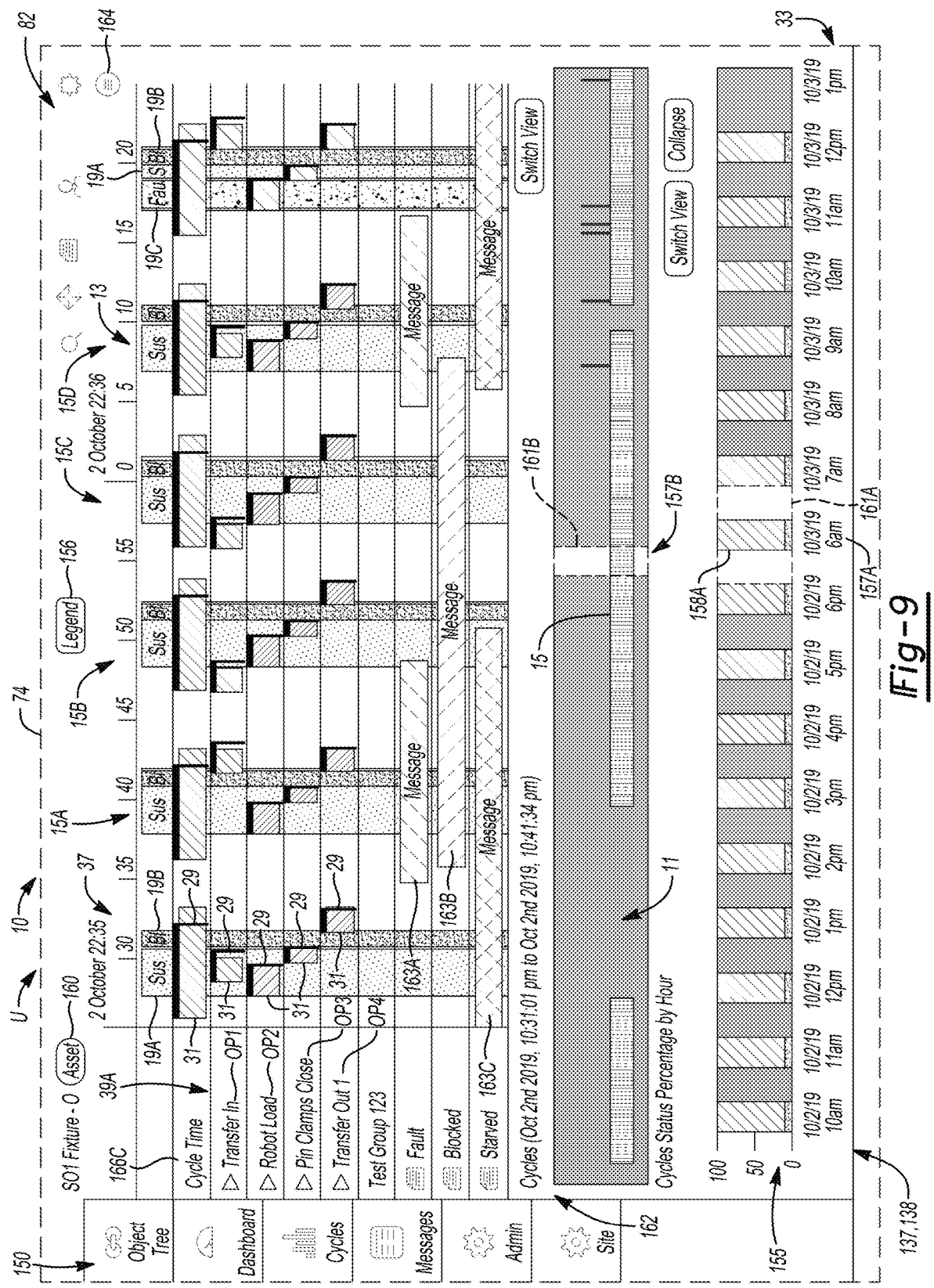
FIG. 9 is a schematic example representation of an automation data display generated by the system shown in FIG. 27, displaying the automation data display shown in FIG. 8, with the SOP cycle state display zoomed in, in response to a user input to the user interface.

In the examples shown in FIGS. 8-13, and in detail in FIGS. 9 and 10, the SOP cycle state display 13 additionally displays, for each operating cycle 15 shown in the display 13, cycle state indicators 19 shown as vertical bars, where each of the cycle state indicators is a differentiated data feature 142, differentiated in the present example, by a color code. For example, and referring to operating cycle 15B shown in FIGS. 9 and 10, a starved cycle state indicator 19A is differentiated by a peach color corresponding to a starved condition state, indicating the selected asset 160, e.g., the S01 Fixture, is in a starved condition for the duration of time indicated by the starved cycle state indicator 19A, during performance of the operating cycle 15B. In one example, a starved condition state is referred to herein as a suspended condition state, where in a starved and/or suspended condition state the selected asset 160 is paused or stopped waiting for a predecessor condition to be satisfied, where the predecessor condition could be, for example, waiting for an incoming part, waiting for completion of another operation feeding one or more of the operations OP1, OP2, OP3, OP4 of the SOP 39A, etc. In the example shown in FIGS. 9-10, a starved condition state message 163C shown in the condition state message display 162 as extending partially through the cycle time of the operating cycle 15B can include a message explaining, for example, the cause of the starved condition and/or a correction action taken to eliminate the starved condition. For example, and referring to the operating cycle 15B shown in FIGS. 9-10, a blocked cycle state indicator 19B is differentiated by a light blue color corresponding to a blocked condition state, indicating the selected asset 160, e.g., the S01 Fixture, is in a blocked condition state during performance of the operating cycle 15B, for the duration of time indicated by the blocked cycle state indicator 19B. In one example, in a blocked condition state the selected asset 160 is paused or stopped waiting for a subsequent operation to be completed, where completion of the subsequent operation is required as a prerequisite for completing the blocked operation. In the example shown in FIGS. 9-10, a blocked condition state message 163B shown in the condition state message display 162 as extending through the cycle time of the operating cycle 15B can include a message explaining, for example, the cause of the blocked condition.

In an example shown in FIG. 9, a faulted cycle state indicator 19C is differentiated by a rose color corresponding to a faulted condition state, indicating the selected asset 160 is in a faulted condition state for the duration of time indicated by the faulted condition state indicator 19C.

In the example shown in FIG. 8, the SOP cycle state display 13 is populated in real time with cycle data for each of the operating cycles 15 performed in the selected time period 157B. For purposes of illustration and description, the operating cycles 15 performed in the selected time period 157B have been identified in FIGS. 8-13 as including operating cycles 15A, 15B, 15C, 15D . . . 15m, 15n, 15n+1 . . . 15n+x, being performed in the order A, B, C, D . . . m, n, n+1 . . . n+x during the selected time period 157B and displayed in order from left to right (as shown on the page) in the SOP cycle state display 13, as illustrated in FIGS. 8-13. Each of the operating cycles 15 is displayed relative to the clock time shown in the horizontal timeline displayed at the top (as shown on the page) of the SOP cycle state display 13, such that the clock time at which a respective operating cycle 15 was performed can be used to orient the respective operating cycle 15 in the selected time period 157B.

In the example shown in FIG. 8-13, various examples of user inputs 153 which can be inputted to the display screen 74 to modify the cycle displays 11, 13, 155, and/or message displays 162 which are displayed simultaneously in the display screen 74 are illustrated. For example, FIGS. 8-12 illustrate progressively zooming in the SOP cycle state display 13, for example, by inputting one or more user inputs 153 such as a spreading touch gesture or equivalent touchpad, mouse or keyboard input, to horizontally expand the displayed operating cycles 15 relative to each other. See for example, the expanded appearance of operating cycle 15n in FIG. 10 as compared with FIG. 9, and the expanded appearance of operating cycles 15A and 15B in FIG. 10 as compared with FIG. 9. In another example illustrated by FIGS. 16 and 17, one or more user inputs 153 such as a pinching touch gesture or equivalent touchpad, mouse or keyboard input can be inputted to the display screen 74 to progressively zoom out the SOP cycle state display 13, shown for example, by a comparison of the relative contracted appearance operating cycles 15A, 15B, 15C, 15D in FIG. 17 as compared with FIGS. 9-11.

In another example shown in FIGS. 10 and 11, one or more user inputs 153, such as a swipe gesture applied to the display screen 74 or equivalent mouse, touchpad, or keyboard input 153 inputted to the user device U can be used to horizontally pan the SOP cycle state display 13 left and/or right (as shown on the page) to view the cycle state information displayed for adjacent operating cycles 15. For example, a user input 153 applied to the SOP cycle state display 13 pans the display 13 to the right (as shown on the page) to view additional details of operating cycle 15A. For example, a user input 153 applied to the SOP cycle state display 13 pans the display 13 to the left (as shown on the page) in FIG. 11 as compared to FIG. 10, to fully display the cycle state information of operating cycle 15C.

The orientation of each of the simultaneously viewed cycle displays 11, 13, 155 to the other cycle displays 11, 13, 155 is maintained as the SOP cycle state display 13 dynamically transitioned and or modified, for example, by a zooming and/or panning user input 153, by the orienting visual relationship between the cycle displays 11, 13, 155 provided by combination the displayed time periods 157 and the orienting feature 161A identifying time period 157A shown in the cycle status display 155, the displayed orienting feature 161B identifying time period 157B and the textual display of the clock time of the time period 157A in the descriptor 166B shown in the heartbeat display 11, and the displayed horizontal timeline of the clock time of time period 157B shown in the SOP cycle state display 13.

The examples shown in FIGS. 10-11 of inputting a user input 153 to zoom, pan, collapse, expand and/or otherwise manipulate and/or modify the SOP cycle state display 13 are non-limiting and illustrative of methods of manipulating and/or modifying other automation data displays 138, including for example, one or more of the cycle displays 11, 13, 155 and/or message displays 162 described herein, and/or data displays generated by populating a display template 137 with data collected via the AOS 10.

Figure 13:
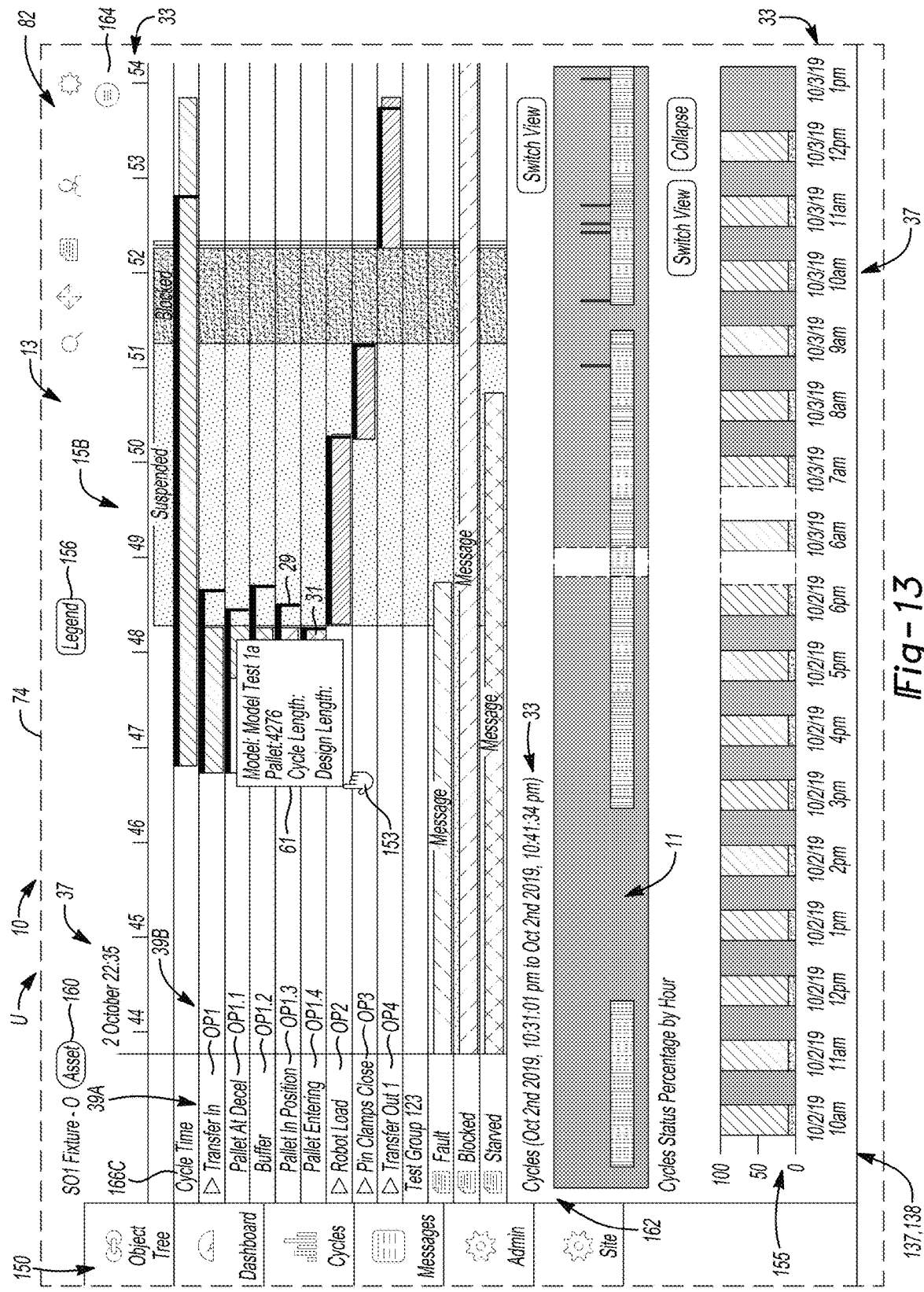
FIG. 13 is a schematic example representation of an automation data display generated by the system shown in FIG. 27, displaying the automation data display shown in FIG. 12, with the SOP cycle state display expanded to display sub-operations of an operation selected by a user input to the user interface.
Figure 14:
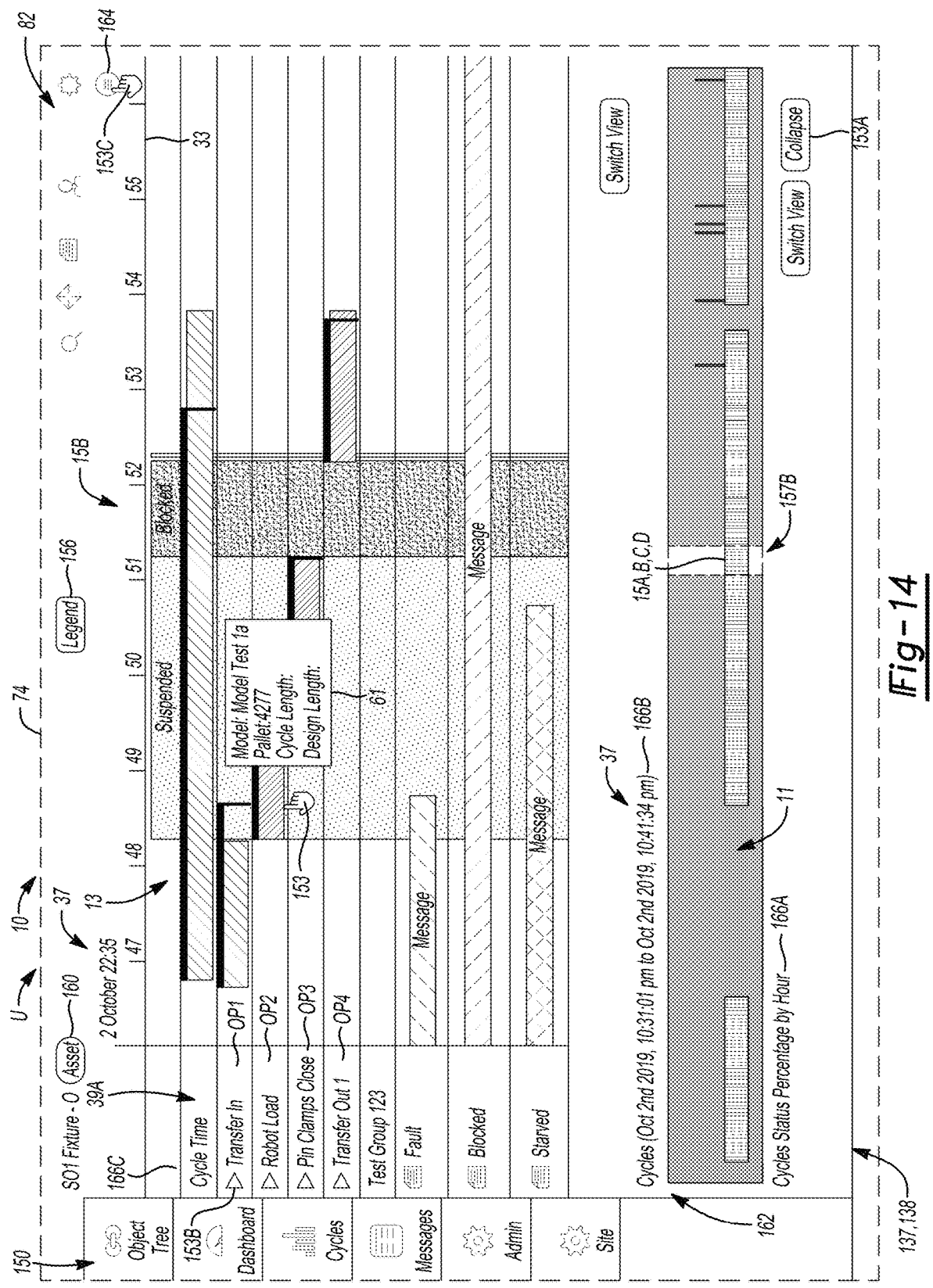
FIG. 14 is a schematic example representation of an automation data display generated by the system shown in FIG. 27, displaying the automation data display shown in FIG. 13, with the SOP cycle state display collapsed to no longer display sub-operations of an operation selected by a user input to the user interface and the cycle status display collapsed, such that the SOP cycle state display expands vertically in the user interface.

Referring now to FIGS. 13 and 14, in the example shown in FIG. 13, a user input 153 is inputted to a drop-down icon, also referred to herein as an expand/contract icon, associated in the display SOP 39A with operation OP1, to actuate the SOP cycle state display 13 to expand the operation OP1 to display a sub-sequence of operations (SOP) 39B. In the example shown in FIG. 13, the sub-SOP 39B includes operations OP1.1, OP1.2, OP1.3, OP1.4, which are performed in the order defined by the sub-SOP 39B, to complete performance of operation OP1. As such, the performance and respective cycle times of operations OP1.1, OP1.2, OP1.3, OP1.4 determines the performance and cycle time of operation OP1, such that being able to actuate the SOP cycle state display 13 with a user input 153, to immediately view and analyze operations OP1.1, OP1.2, OP1.3, OP1.4 when analyzing operation OP1, is an advantage of the AOS 10 system described herein. In response to the user input 153, and as shown in FIG. 13, the SOP cycle state display 13 expands vertically and displays baseline cycle time indicators 29 and actual cycle time indicators 31 for each of the operations OP1.1, OP 1.2, OP1.3, OP1.4 of the sub-SOP 39B performed by the selected asset 160, e.g., by the S01 Fixture in the present example. In the example shown in FIG. 13, a user input 153 applied to the cycle time indicator 31 corresponding to the operation OP3 actuates the SOP cycle state display 13 to display an information box 61, showing additional information related to the selected operation OP3 and operating cycle 15B.

In the example illustrated by FIGS. 13 and 14, various user inputs 153 are inputted to the display screen 74 to modify how one or more of the cycle displays 11, 13 and 155 are displayed in the display screen 74. In the example shown in FIG. 14, a user input 153A is inputted to a "Collapse" icon associated with the cycle status display 155, actuating the display screen 74 and/or user device U to collapse the cycle status display 155 such that only the display descriptor 166A remains displayed on the display screen 74 as a visual indicator to a user/viewer that the cycle status display 155 is actuated in the display screen 74. As shown in FIG. 14, when the cycle status display 155 is collapsed, the SOP cycle state displayed 13 is automatically expanded vertically (as viewed on the page) in the display screen 74 to fill the screen space made available by the collapse of the cycle status display 155. A subsequent user input 153 to a "Switch View" icon adjacent to the "Collapse" icon can be inputted to expand the cycle status display 155 such that the display 155 is viewable again in the display screen 74. As such, the method provides flexibility for the immediate collapse and expansion of the varying display screens 11, 13, 155, 162 to facilitate quick review of the automation data displayed by each of these displays 11, 13, 155, 162, without having to switch or toggle between multiple screens. Further, selective collapse of one or more of the multiple displays 11, 13, 155, 162, etc. displayed simultaneously in the display screen 74 provides a user with options in selecting an expanded view of one or more of the displays 11, 13, 155, 162 over the others. For example, collapsing the SOP cycle state display 13 automatically collapses the overlaid condition state message display 162, automatically expanding the remaining cycle status display 155 and heartbeat display 11 into the screen space vacated by collapse of the SOP cycle state display 13, such that with the SOP cycle state display 13 collapsed, the display screen 74 appears as shown in FIG. 6.

In another example shown in FIG. 14, a user input 153B is inputted to the expand/contract icon associated in the display SOP 39A with operation OP1, to actuate the SOP cycle state display 13 to contract the display of the sub-SOP 39B, such that the sub-SOP 39B and the cycle time indicators 29, 31 associated with the operations OP1.1, OP1.2, OP1.3, OP1.4 are no longer displayed by the SOP cycle state display 13, the cycle time indicators 29, 31 associated with the operations OP1, OP2, OP3, OP4 of the SOP 39A expand vertically in the space vacated by the sub-SOP 39B. As such, the method provides flexibility for the immediate collapse and expansion of the varying sub-SOP 39 of one or more of the operations OP1, OP2, OP3, OP4 to facilitate quick review of the automation data displayed by each of these sub-SOPs 39, without having to switch or toggle between multiple screens.

Figure 15:
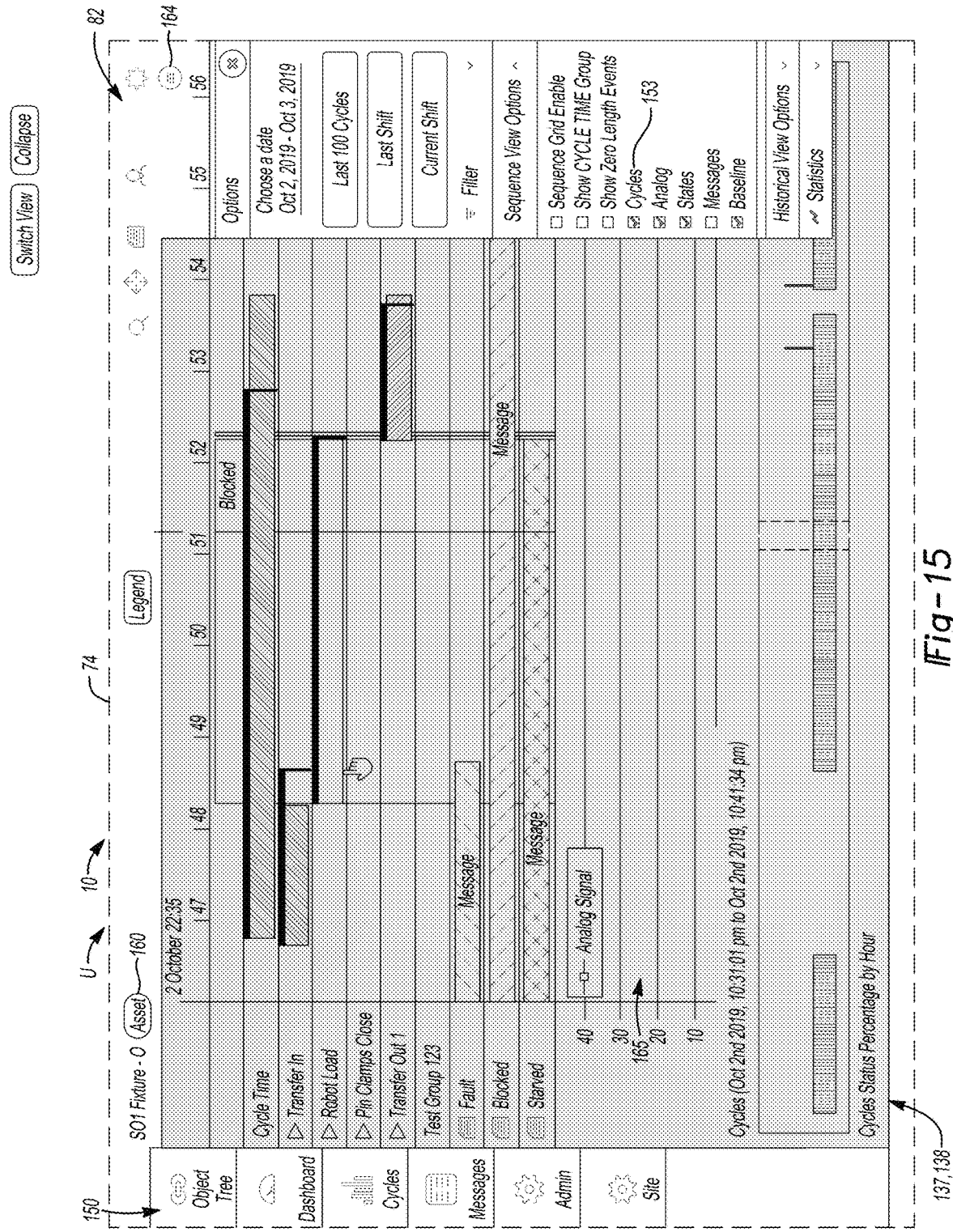
FIG. 15 is a schematic example representation of an automation data display generated by the system shown in FIG. 27, displaying the automation data display shown in FIG. 14, further displaying a display option menu for selecting display features including an analog parameter display.
Figure 16:
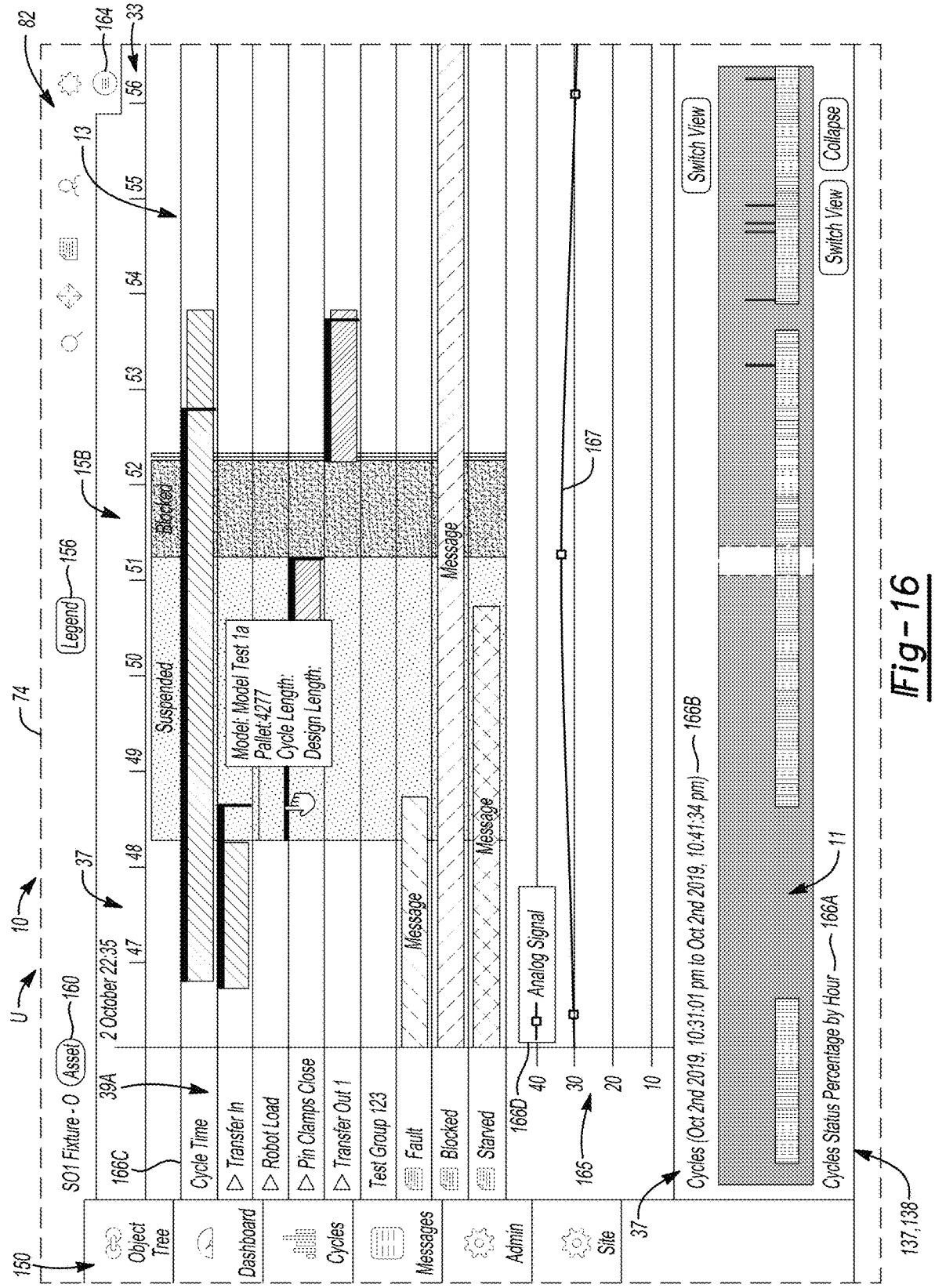
FIG. 16 is a schematic example representation of an automation data display generated by the system shown in FIG. 27, displaying the automation data display shown in FIG. 15, further displaying the selected analog parameter display, display analog parameter data in real time with the corresponding cycle indicators shown in the SOP cycle state display.
Figure 17:
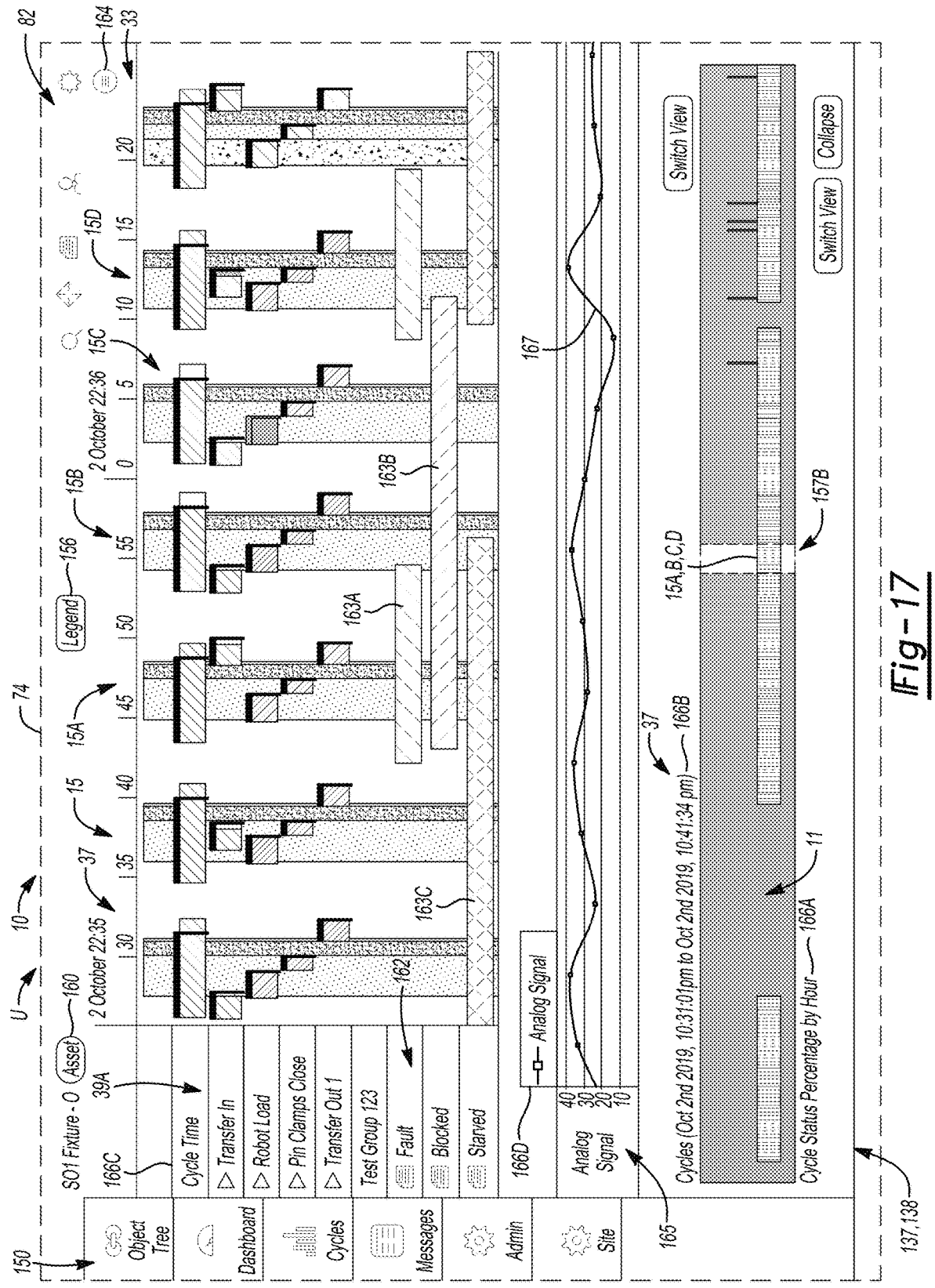
FIG. 17 is a schematic example representation of an automation data display generated by the system shown in FIG. 27, displaying the automation data display shown in FIG. 16, zoomed out to display additional cycles and to view variability of the parameter data over a longer period of time.

In another example shown in FIGS. 14-16, a user input 153C is inputted to the display menu icon 164 as shown in FIG. 14, to actuate the display screen 74, as shown in FIG. 15, to simultaneously open the display menu 164 and actuates a transparent (see-through) window over the cycle displays 11, 13, 155 while the display menu 164 is open. In the example shown in FIG. 15, a user input 153 is inputted to the display menu 164 to display a drop-down list of items for inclusion in the display. In the example shown in FIG. 15, items "Cycles", "States" and "Baselines" are selected. As shown in FIG. 15, a user input 153 is inputted to the selection box associated with "Analog", actuating the display screen 74, as also shown in FIG. 15, to display another automation data display 138 on the display screen 74, identified as an analog display 165. The analog display 165 displays a parameter descriptor 166D, which describes the analog parameter to be displayed, for example, "Hydraulic Pressure", "Oil Pressure", "Temperature", etc. As shown in FIG. 16, the analog display 165 is populated with analog data 167 for the selected analog parameter 166D, where the analog data 167 is displayed in real time with the horizontal timeline 157B shown in the SOP cycle state display 13, such that the analog data 167 can be visually associated in real time with the cycle state indicators 31 shown for the various operating cycles 15 in the SOP cycle state display 13, and such that the horizontal time line 157B orients the analog display 165 relative to the SOP cycle state display 13. As shown in FIGS. 15-17, the display screen 74 simultaneously displays the heartbeat display 11, the SOP cycle state display 13, the condition state message display 162, the analog display 165, and the cycle status display 155 (shown in collapsed view) such that a user/view is advantaged by the ability to manipulate, via one or more user inputs 153 inputted to the display screen 74, the various data displays 11, 13, 155, 162, 165 to view, compare, and analyze automation data from multiple operating cycles 15, and from multiple operations OP of various sequences of operations (SOP) 39 including sub-SOPs.

In the example shown in FIGS. 16-17, one or more user inputs 153 are inputted to the display screen 74 and/or to the user device U to manipulate the data displays 13, 165. In one example, the analog display 165 is associated with the SOP cycle state display 13 via the horizontal timeline 157B such that a user input 153 to zoom and/or pan one of the displays 165, 13 automatically zooms and/or pans the other of the displays 165, 13, the overlaid condition state message display 162, and the horizontal timeline 157B, such that the displays 162, 165, 13 and the horizontal timeline 157B are dynamically and automatically re-oriented to each other and the actual timeline display 33 during a zoom and/or pan user input 153 inputted to either of the displays 13, 165, as illustrated during the progressive zooming out of the data displays 13, 165 shown in FIGS. 16 and 17. As shown in FIGS. 16-17, the capability to zoom out to display an increasing number of operating cycles 15 in the display screen 74 provides an advantage of being able to visually observe variability in the analog data 167 which is not perceptible when only one or a few operating cycles 15 are viewed as shown in FIG. 16.

Figure 18:
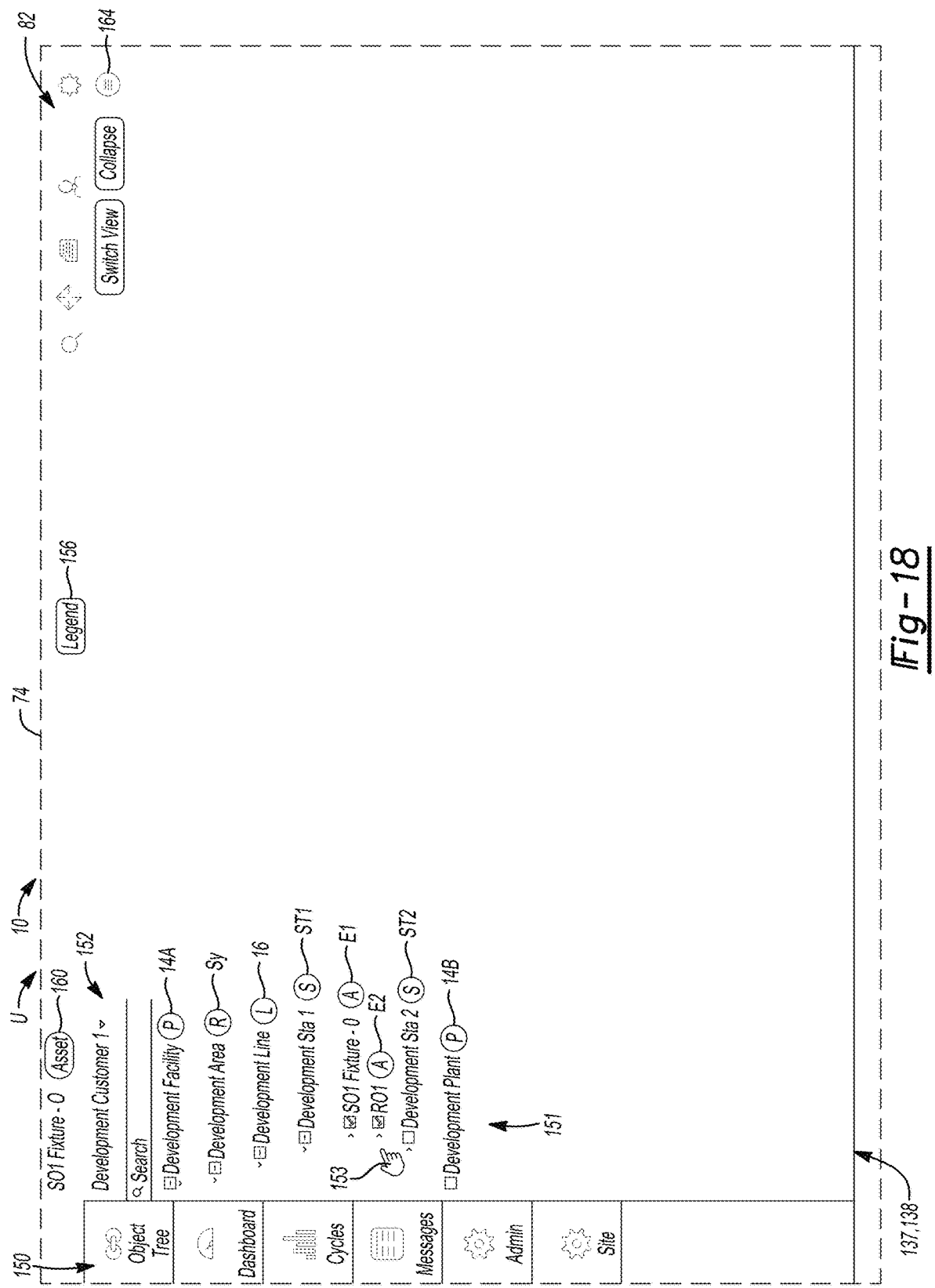
FIG. 18 is a schematic example representation of an automation data display generated by the system shown in FIG. 27, displaying an expanded asset tree and indicating selection of a plurality of assets from the asset tree by a user input to the automation data display.
Figure 19:
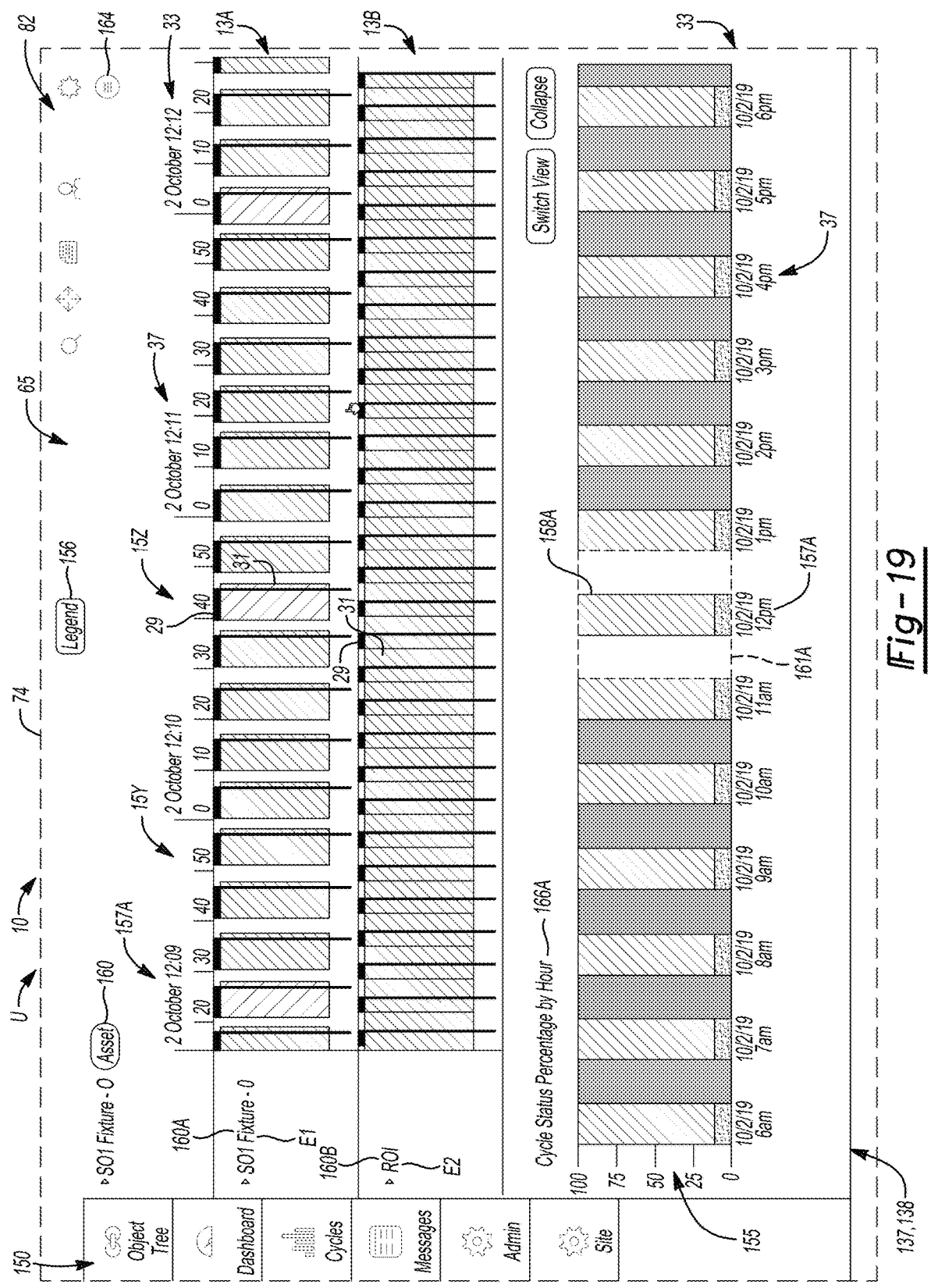
FIG. 19 is a schematic example representation of an automation data display generated by the system shown in FIG. 27, displaying a cycle status display for the assets selected in FIG. 18, and concurrently displaying a first SOP cycle state display for the first asset and a second SOP cycle state display for the second asset, each of the first and second SOP cycle state displays corresponding to a time period selected from the cycle status display and indicated in the cycle status display by an orientor data feature.

Referring now to FIGS. 18-26, a method of simultaneously displaying automation data from multiple assets 151 is illustrated and described herein. FIG. 18 shows an asset tree 152 as previously described for FIG. 2 herein. In the example shown in FIG. 18, a user input 153 is inputted to the selection box corresponding to element E1, which auto-fills the selection boxes of the higher level assets 151 including the element E1, and a user input is inputted to the selection box corresponding to element E2, such that two assets 151 of the station ST1 are selected for display in the display screen 74, where the first selected asset 160A, element E1, is identified in the present example as "S01 Fixture" and the second selected asset 160B, element E2, is identified in the present example as element "R01". In the present example, as shown in and previously described for FIG. 3, the display screen 74, in response to the user inputs 153 selecting assets E1 and E2, generates and displays a cycle status display 155 for the first selected asset 160A selected in FIG. 18, which in the present example is element E1, as previously described herein related to FIG. 2. The cycle status display 155 is displayed relative to an actual timeline display 33 showing the clock time 37 corresponding to each cycle status bar 158. As shown in FIGS. 2 and 3 and as previously described herein, a user input 153 is inputted to the display screen 74 to select the cycle status bar 158A and time period 157A, for example, by a touch input such as a drag over or double tap, or by scrolling over the cycle status bar 157A. Selection of the cycle status bar 158A, as shown in FIG. 4, actuates the screen display 74 to generate, as shown in FIG. 19, additional second and third automation data displays 138 for the time period 157A, which are simultaneously displayed with the currently displayed cycle status display 155. In the example shown in FIGS. 19-20, the second data display 138 is configured as a SOP cycle state display 13A generated for the first selected asset 160A, which in the present example is element E1, the "S01 Fixture", and the third data display 138 is configured as a SOP cycle state display 13B generated for the second selected asset 160B, which in the present example is element E2, identified as "R01" in the asset tree 152.

Figure 20:
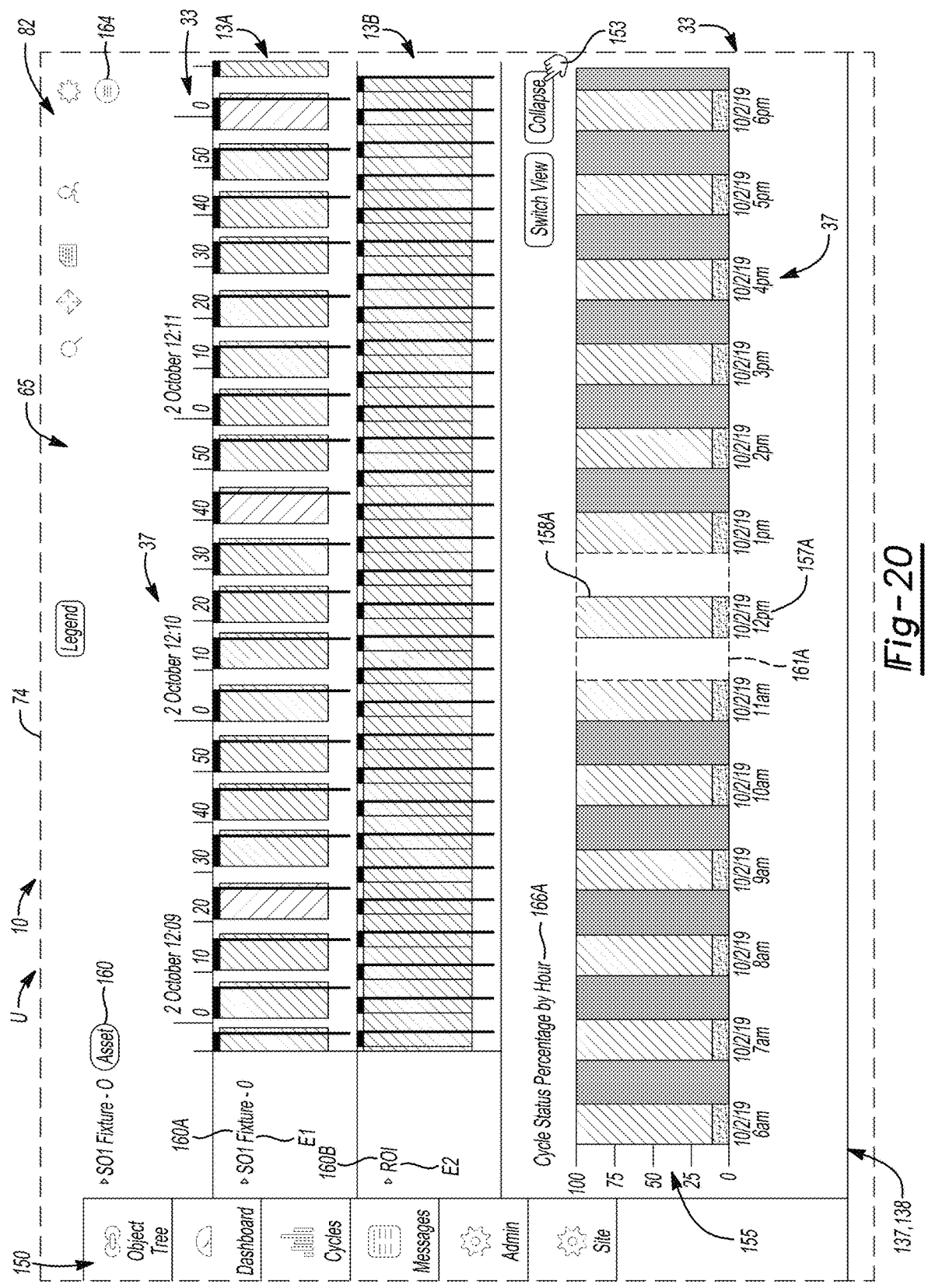
FIG. 20 is a schematic example representation of an automation data display generated by the system shown in FIG. 27, displaying the automation data display shown in FIG. 19, zoomed in to expand viewing of cycles in the first and second SOP cycle state displays and showing a user input to a "Collapse" icon associated with the cycle status display.

In the example shown in FIGS. 19-20, each of the first and second SOP cycle state displays 13A, 13B are displayed simultaneously with the cycle status display 155. In the examples shown in FIGS. 19-20, the time period 157A displayed in the cycle status display 155 is oriented to each of the first and second SOP cycle state displays 13A, 13B by the orienting feature 161A, such that it is instantaneously visually apparent which time period of operating cycles 15 are being displayed in SOP cycle state displays 13A, 13B. Additionally, the actual clock time 37 within the time period 157A is indicated in a horizontal timeline display 33 along the top (as viewed on the page) of the SOP cycle state display 13A, to orient the displayed operating cycle 15 to the selected time period 157A.

In the example shown in FIGS. 19-20, the SOP cycle state display 13A displays an actual cycle time indicator 31 and a baseline cycle time indicator 29 for each operating cycle 15 performed by the selected element 160A and displayed on the display screen 74, where the cycle time indicators 29, 31 indicate the cycle time for the sequence of operations (SOP) 39A (see FIG. 24) performed by the selected asset 160A, e.g., performed by the first element E1. The SOP cycle state display 13B displays an actual cycle time indicator 31 and a baseline cycle time indicator 29 for each operating cycle 15 performed by the selected element 160B and displayed on the display screen 74, where the cycle time indicators 29, 31 indicate the cycle time for the operations OP of the sequence of operations (SOP) 39 performed by the selected asset 160B, e.g., performed by the second element E2. In the examples shown in FIGS. 19-20, one or more panning user inputs 153, such as a swipe gesture, can be inputted to the display screen 74 to pan the SOP cycle state displays 13A, 13B to the left and/or to the right (as shown on the page) to view and/or analyze various operating cycles 15 of the selected assets 160A, 160B displayed on the display screen 74. The SOP cycle state displays 13A, 13B are synchronized such that a panning user input 153 to one of the displays 13A, 13B to actuates the display screen 74 to pan both cycle state displays 13A, 13B and the timeline display 33 simultaneously, such that the operating cycles 15 displayed by each of the displays 13A, 13B remain aligned with the horizontal timeline 33 showing the actual clock time 37 when each operating cycle 15 was performed within the time period 157A. Advantageously, by displaying the SOP cycle state displays 13A, 13B of multiple selected assets 160A, 160B, a user/view can visually analyze the operating performance of multiple assets 151 within the same display screen 74, and without having to toggle between multiple displays or display windows. Further, the multiple asset display illustrated in FIGS. 19-26 is advantaged by showing the operating cycles 15 performed by each of the multiple selected assets 160A, 160B oriented to a selected time period 157A and to an actual timeline display 33, such that the relative performance the assets 160A, 160B at the same actual time 37 can be visually assessed, and/or, for example, the performance the assets 160A, 160B relative to each other over the selected time period 157A can be visually assessed, the later being advantageous, for example, when one of the selected assets 160A, 160B is performing one or more operations OP which are predecessor, e.g., feeding operations to operations OP performed by the other of the selected assets 160A, in analyzing blocked and starved conditions.

Figure 21:
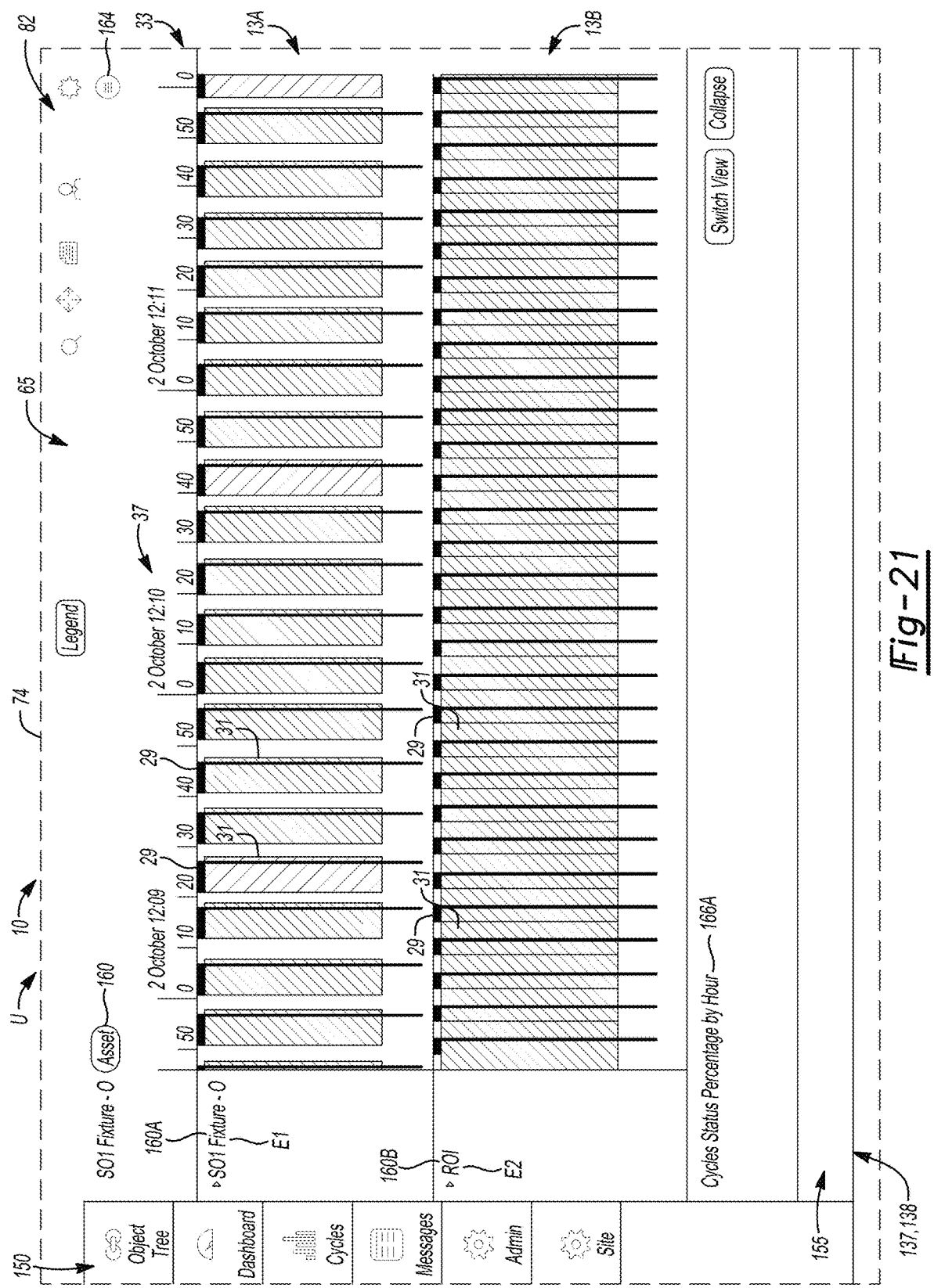
FIG. 21 is a schematic example representation of an automation data display generated by the system shown in FIG. 27, displaying the automation data display shown in FIG. 20 with the cycle status display collapsed and the first and second SOP cycle state displays expanded vertically in the user interface.

In the example shown in FIGS. 20-21, a user input 153 is inputted to the "Collapse" icon associated with the cycle status display 155 such that the display screen 74, in response to the user input 153 and as shown in FIGS. 20 and 21, immediately collapses the cycle status display 155, displaying, after collapsing the display 155, the descriptor 166A as a visual indicator that display 155 can be expanded for viewing by a user input to the "Switch view" icon adjacent to the "Collapse" icon. Concurrent with the collapse of the cycle status display 155, as shown in FIG. 21, the SOP cycle state displays 13A, 13B immediately expand into the screen space vacated by the collapsed display 155, such that the displays 13A, 13B are magnified for easier viewing by a user/view of the display screen 74.

Figure 22:
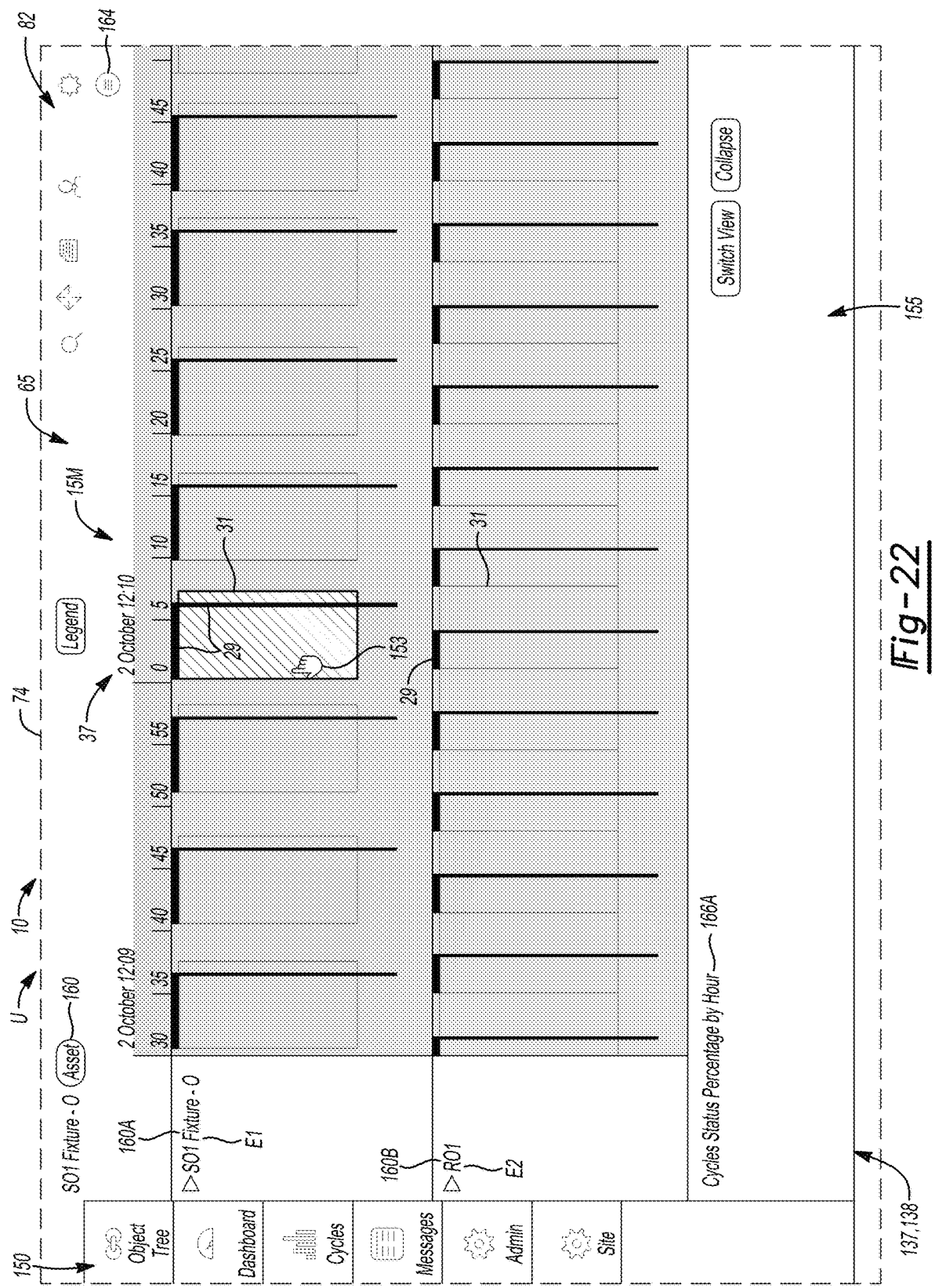
FIG. 22 is a schematic example representation of an automation data display generated by the system shown in FIG. 27, displaying the automation data display shown in FIG. 21 zoomed in and panned to show a horizontally expanded view of selected cycles performed by the first and second assets and displayed via the first and second SOP cycle state displays.
Figure 23:
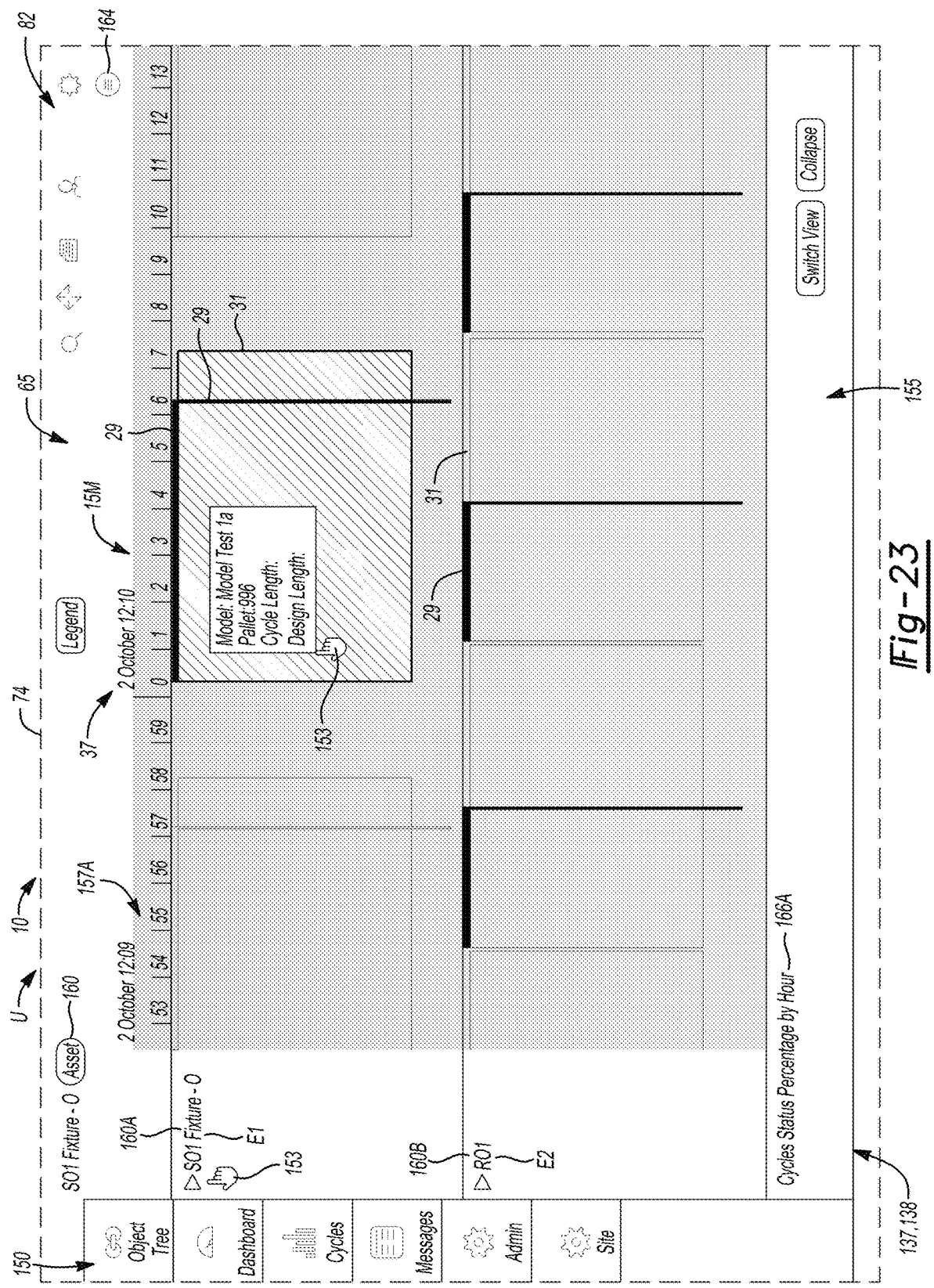
FIG. 23 is a schematic example representation of an automation data display generated by the system shown in FIG. 27, displaying the automation data display shown in FIG. 22, further zoomed in and further showing an information window displayed in response to a user input to a selected cycle bar of the first SOP cycle state display.

Referring to FIGS. 22-23, additional examples of methods for manipulating the multiple asset display are illustrated, including, for example, inputting one or more user inputs 153 to the display screen 74 to zoom the SOP cycle state displays 13A, 13B, for example, by inputting a user input 153 such as a spread gesture for zooming in, and/or a pinch gesture for zooming out. As previously described herein relating to a panning user input 153, a zooming user input 153 inputted to one of the displays 13A, 13B will actuate simultaneous zooming of both of the SOP cycle state displays 13A, 13B and the timeline display 33, such that the operating cycles 15 displayed in each of the displays 13A, 13B remain oriented to the horizontal timeline 33 and actual clock time 37 associated with each of the operating cycles 15 and to each other in real time. As shown in FIG. 23, a user input 153 inputted to an actual cycle time indicator 31 actuates the cycle display 13A, in the example shown, to simultaneously display an information box 61 with the cycle displays 13A, 13B, to provide additional detail information associated with the selected actual cycle time indicator 31.

Figure 24:
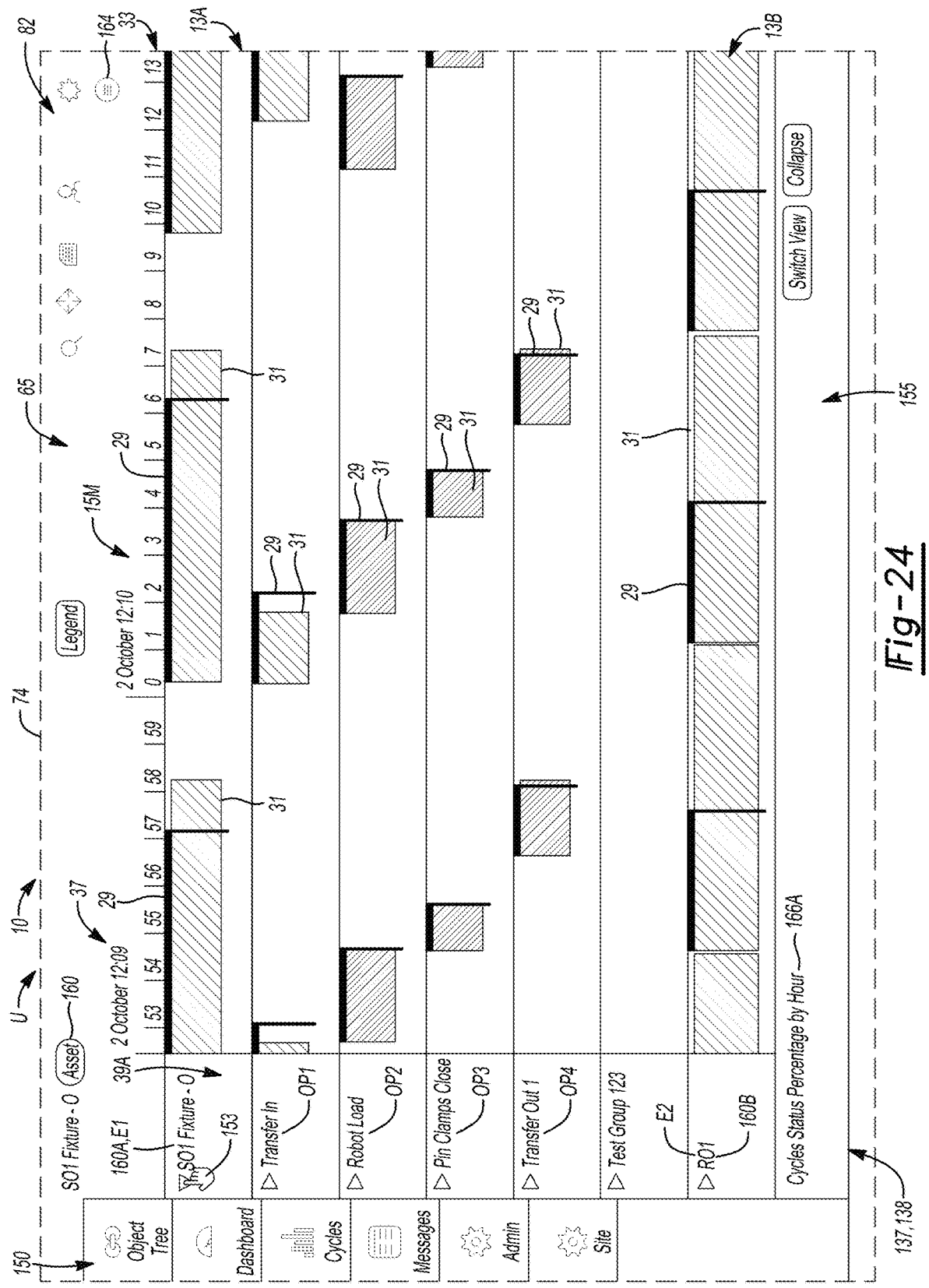
FIG. 24 is a schematic example representation of an automation data display generated by the system shown in FIG. 27, displaying the automation data display shown in FIG. 23, further expanding the first SOP cycle state display via a user input to the first asset icon, to display SOP cycle indicators for each operation performed by the first asset over a plurality of operation cycles performed by the first asset.

In an example shown in FIGS. 23-24, a user input 153 inputted to a expand/contract icon associated with a selected element 160, in the present example, the selected element 160A, actuates the SOP cycle display 13A to expand to display the sequence of operations (SOP) 39A performed by the selected element 160, in the present example, the "S01 Fixture". In the present example, the operations OP1, OP2, OP3, OP4 of the SOP 39A and the actual and baseline cycle indicators 29, 31 for each of the operations OP1, OP2, OP3, OP4 is displayed, to provide additional visual information for analysis of the operating cycles 15 performed by the selected asset 160A. In the example shown in FIGS. 23-24, the SOP cycle state display 13B is simultaneously contracted as the SOP cycle state display 13A expands to display the SOP 39A, such that the modification to and transitioning of the displayed automation data is seamless, without any loss of visibility of the data to a user/viewer, and without having to toggle between display windows or change display screens.

Figure 25:
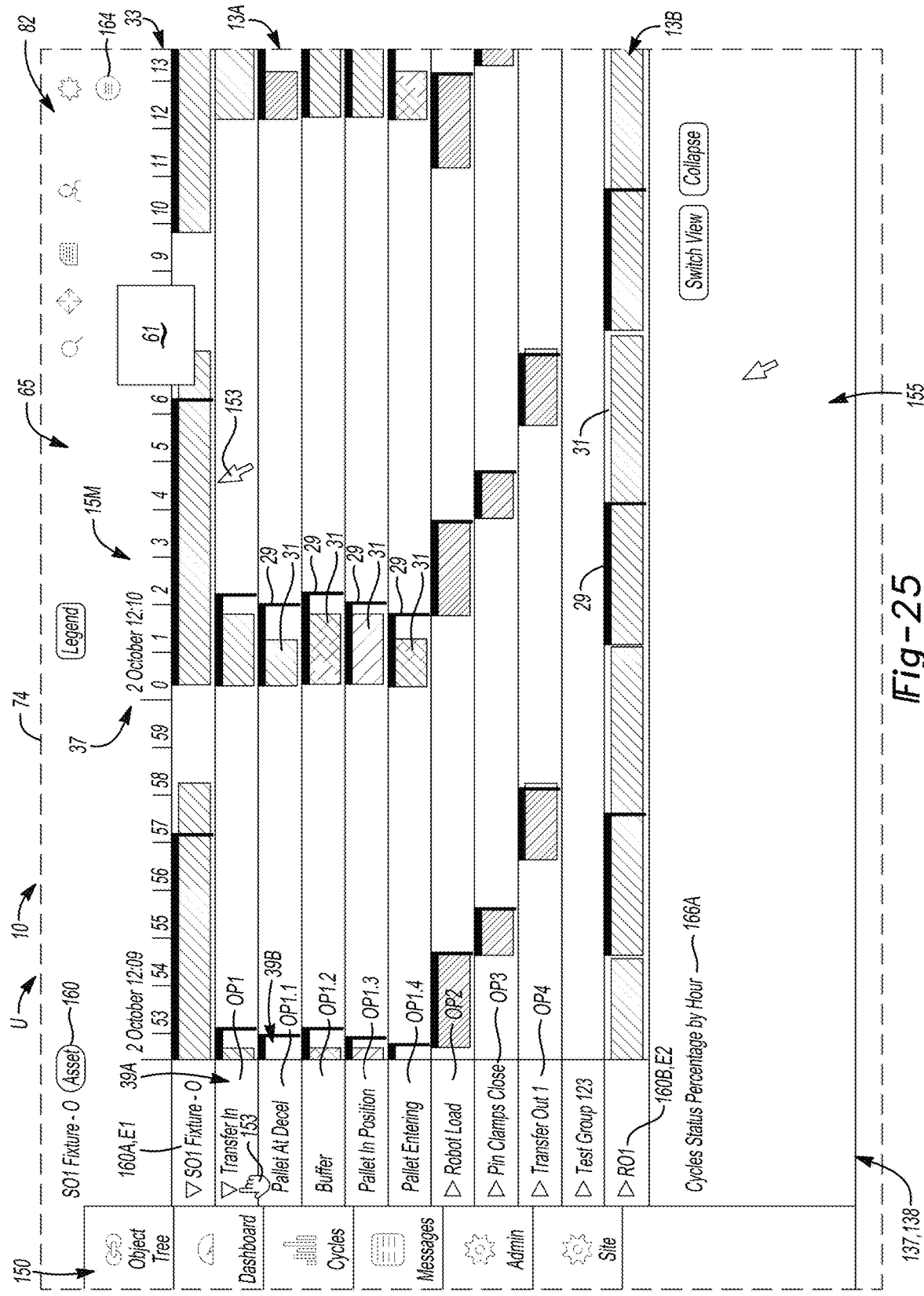
FIG. 25 is a schematic example representation of an automation data display generated by the system shown in FIG. 27, displaying the automation data display shown in FIG. 24, further expanding the first SOP cycle state display via a user input to the first operation icon associated with the first asset, to display SOP cycle indicators for each sub-operation operation of the selected operation performed by the first asset over a plurality of operation cycles performed by the first asset.

As shown in FIGS. 24-25, a user input 153 inputted to an expand/contract icon associated in the display with operation OP1 actuates the SOP cycle state display 13A to expand to display the sub-SOP 39B, including operations OP1.1, OP1.2, OP1.3, OP1.4, and their associated actual and baseline cycle indicators 29, 31. In the example shown in FIG. 25, a user input 153 inputted to the actual cycle time indicator 31 associated with the first selected asset 160A actuates the cycle display 13A, in the example shown, to simultaneously display an information box 61 with the cycle displays 13A, 13B, to provide additional detail information associated with the selected asset 160A and selected actual cycle time indicator 31.

The examples shown in FIGS. 24-25 are non-limiting and illustrative. For example, additional user inputs 153 can be inputted to the display screen 74 shown in FIGS. 23-25, to expand a sequence of operations (SOP) performed by the second selected asset 160B, and/or to expand another of the operations such as OP2 or OP1.3, by illustrative example, to display additional detailed automation data to the display screen 74. A user/viewer can, via multiple user inputs 153 to the display screen 74, selectively expand and/or collapse sequences of operations 39 performed by each of the selected assets 160A, 160B, to dynamically review and/or analyze the operating performance of the multiple displayed assets. In one example, a user can select additional assets 151 from the asset tree 152 for simultaneous display with the displayed assets 160A, 160B, and/or can deselect one or more of the previously selected assets 160A, 160B and select one or more assets 151 from the asset tree 152, such that the display of automation data from multiple assets 151 can be dynamically manipulated via the user inputs 153 to the display screen 74.

In the example shown in FIG. 26, additional displays can be actuated by a user input 153 including, as shown in the example, a legend 77 which can be displayed in response to a user input 153 to a legend icon 156, to assist a user/view in interpreting the differentiated data features 142 displayed in the various displays 138. In the present example, the legend 77 is coded by color, hatching, or other differentiating feature, to assist in interpretation of the various color codes and/or hatching patterns of other differentiating feature displayed by the differentiated data features 142 shown in the example data displays 11, 13, 155, 162, 165 described herein.

The examples illustrated by FIGS. 18-26 are exemplary and non-limiting, such that the multiple asset display shown in FIGS. 18-26 is not limited to the display of two selected assets 160A, 160B. For example, a plurality of selected assets 160A . . . 160n, including three or more assets 151, can be selected from an asset tree 152 for simultaneous display of at least one automation data display 138 associated with each of the selected assets 160A . . . 160n, where the term "associated" as used in this context, indicates the automation data display 138 associated with a selected asset 160x is generated using automation data collected from and/or defined by the selected asset 160x. For example, the automation data display 138 displayed for each of the multiple selected assets 160A . . . 160n can be a respective heartbeat cycle display 11 associated with each of the respective selected assets 160A . . . 160n.

Referring to FIG. 30, shown is an exemplary method 200 for generating an automation data display 138 and for dynamically modifying the automation data display 138 shown on the display screen 74 in response to a user input 153 received by the user interface 74 as illustrated by FIGS. 1-26. At 205, an initial automation data display 138 is generated displaying a selection menu 150 including icons 154 for selecting an object tree 152, a dashboard, cycle displays 11, 13, 155, messages 162, etc. At 210, a user input is entered to a selected menu icon 154, such as the object tree icon 154A, and an asset tree display 152 is generated and displayed on the user interface 74. Additional user inputs 153 are entered at 210, for example, to expand the asset tree 152 to show various levels of assets 151 and/or to select one or more assets 151. At 215, in response to a user input 153 selecting one or more assets, the automation system generates and displays at least one cycle display 11, 13, 115 corresponding to each of the selected assets, in real time and displaying a plurality of operating cycles of a sequence of operations (SOP) performed by each of the selected assets. The method continues at 220 with the automation operating system receiving additional user inputs 153 to the user interface 74, and modifying the data displays 138 in response to the user inputs 153. As illustrated in FIG. 30, the method 200 can continue by returning to one or more of 210, 215, 220, in response to user inputs 153 input to the user interface 74, such that dynamic manipulation and modification of the automation data displays 138 can occur continuously, to provide relevant data in real time to the user for monitoring and diagnosing the automation operations in real time, and to expedite identification and execution of corrective, improvement and preventive actions related to the automation operations.

Other configurations of multiple asset displays are included in the scope of the present disclosure. For example, a multiple asset display as described for FIGS. 2-4 and 19-26 can be generated for multiple systems SY1 . . . SYn selected, for example, from an asset tree 152 of a facility 14 and/or enterprise 12, where the systems SY can each generate analog parameter data, such that the method disclosed herein can be used to simultaneously display the respective analog parameter data of each of the multiple selected systems SY1 . . . SYn. In one example, the method of simultaneously displaying automation from multiple selected assets and include selecting assets 151 from different levels of the asset tree 152, and/or from asset trees 152 of different facilities 14, for example, to compare the operating behavior of an asset 151 from a first facility 14 to the operating behavior of a substantially similar asset 151 operating in a second facility 14.

The illustrative examples provided by the figures are non-limiting and it would be understood that the display templates 137 shown herein as data populated automation data displays 138 are representative of only a portion of the display templates 137 and automation data displays 138 which can be generated by the system described herein and/or using data of an AOS 10. For example, as shown in the display menu 150 in the figures, an automation data display 138 configured as a dashboard can be selected and displayed via the display screen 74, simultaneously with another of the automation data displays 138 described herein.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for displaying automation data for an automation system via an automation data display, the method comprising:
   displaying an asset tree display on a user interface of a user device;
   the asset tree display displaying a textual hierarchical representation of a plurality of assets;
   each asset of the plurality of assets actuable to perform at least one operation of an ordered sequence of operations (SOP) for a plurality of operating cycles;
   receiving, by an automation system including at least one processor, a first user input to the asset tree displayed on the user interface indicating a selection of a first asset of the plurality of assets;
   generating, in response to the selection of the first asset, via the automation system and in real time, a first cycle display of the plurality of operating cycles of said at least one operation performed by the first asset;
   wherein the first cycle display is selected from the group consisting of:
     a cycle status display;
     a heartbeat cycle state display; and
     a sequence of operations (SOP) cycle display;
   displaying, via the user interface, the first cycle display and a timeline display; and
   the timeline display displaying an actual performance time of each operating cycle of the plurality of operating cycles performed by the first asset and displayed via the first cycle display.

2. The method of claim 1, further comprising:
   generating an actual cycle time for each operating cycle of the plurality of operating cycles performed by the first asset, via the automation system;
   determining a condition state for each operating cycle of the plurality of operating cycles performed by the first asset, via the automation system; and
   displaying, via the first cycle display, an indication of the actual cycle time and an indication of the condition state for each operating cycle of the plurality of operating cycles performed by the first asset.

3. The method of claim 2, wherein:
   the first cycle display is the cycle status display;
   the indication of the actual cycle time is a cycle status bar displaying a cumulative status of actual cycle times determined for operating cycles performed in a time period displayed by the display timeline; and
   the indication of the condition state is determined by a comparison of the actual cycle time to a baseline cycle time of the operating cycle.

4. The method of claim 2, wherein:
   the first cycle display is the heartbeat cycle state display;
   the indication of the actual cycle time is a heartbeat cycle bar displaying an actual cycle time determined for each operating cycle performed by the first asset in a time period displayed by the display timeline; and
   the indication of the condition state is determined by a comparison of the actual cycle time to a baseline cycle time of the operating cycle.

5. The method of claim 2, wherein:
   the first cycle display is the SOP cycle state display;
   the indication of the actual cycle time is an actual cycle indicator for the at least one operation;
   the method further comprising:
     displaying, via the user interface, the at least one operation performed by the first asset;
     displaying an actual cycle indicator for the at least one operation, for each operating cycle of the at least one operation performed by the first asset in a time period displayed by the display timeline, wherein said actual cycle indicator is displayed relative to an actual time said operating cycle is performed by the first asset;
     displaying a baseline cycle indicator for the at least one operation, for each operating cycle of the at least one operation performed by the first asset, wherein said baseline cycle indicator is displayed relative to said actual cycle indicator.

6. The method of claim 5, wherein the indication of the condition state includes a first condition state indication and a second condition state indication;
   wherein the first condition state indication is a cycle time condition indicated by displaying the baseline cycle indicator relative to said actual cycle indicator;
   wherein the second condition state indication is an operating state condition indicated by displaying said actual cycle indicator including a condition state differentiator corresponding to the operating state condition;
   the method further comprising:
     determining, via the automation system, a second condition state for each operating cycle of the at least one operation performed by the first asset;
     wherein the second condition state is one of an acceptable, blocked, starved or faulted condition state; and
     displaying said actual cycle indicator including the condition state differentiator corresponding to the second condition state.

7. The method of claim 2, further comprising:
   receiving, by the automation system, a second user input to a data feature of the first cycle display;
   displaying, in response to the second user input, an information window;
   wherein the information window displays information defined by the data feature; and
   wherein the data feature is one of the indication of the actual cycle time or the indication of the condition state.

8. The method of claim 1, further comprising:
   receiving, by the automation system, a second user input to the user interface;
   modifying, in response to the second user input, the first cycle display;
   wherein modifying the first cycle display includes zooming the first cycle display or panning the first cycle display;
   wherein zooming the first cycle display actuates the first cycle display and the timeline display to zoom simultaneously; and
   wherein panning the first cycle display actuates the first cycle display and the timeline display to pan simultaneously.

9. The method of claim 1, further comprising:
receiving, by the automation system, a second user input to the first cycle display;
selecting, via the second user input, a first time period displayed by the first cycle display;
generating, in response to the second user input, a second cycle display;
displaying, via the user interface, the second cycle display for the first time period;
wherein the second cycle display is selected from the group consisting of:
 a cycle status display;
 a heartbeat cycle state display; and
 a sequence of operations (SOP) cycle display;
the timeline display displaying the actual time associated with the first asset performing said at least one operation for each operating cycle of the plurality of operating cycles displayed via the second cycle display; and
wherein the second cycle display, the first cycle display and the timeline display are concurrently displayed on the user interface.

10. The method of claim 9, further comprising:
displaying a display menu on the user interface;
receiving, by the automation system, a third user input to the display menu;
selecting, via the third user input, an analog parameter associated with the sequence of operations;
generating, in response to the third user input, an analog parameter display;
wherein the analog parameter display displays analog data for the selected analog parameter in real time with the timeline display displaying the actual time associated with the plurality of operating cycles displayed via the second cycle display;
displaying, via the user interface, the analog parameter display for the first time period; and
wherein the analog parameter display, the second cycle display, the first cycle display and the timeline display are concurrently displayed on the user interface.

11. The method of claim 9, further comprising:
receiving, by the automation system, a third user input to the second cycle display;
selecting, via the third user input, a second time period displayed by the first cycle display;
generating, in response to the second user input, a third cycle display;
displaying, via the user interface, the third cycle display for the second time period;
wherein the third cycle display is selected from the group consisting of:
 a cycle status display;
 a heartbeat cycle state display; and
 a sequence of operations (SOP) cycle display;
the timeline display displaying the actual time associated with the first asset performing said at least one operation for each operating cycle of the plurality of operating cycles displayed via the third cycle display; and
wherein the third cycle display, the second cycle display, the first cycle display and the timeline display are concurrently displayed on the user interface.

12. The method of claim 11, wherein:
the first cycle display is the cycle status display;
the second cycle display is the heartbeat cycle state display; and
the third cycle display is the SOP cycle state display.

13. The method of claim 11, further comprising:
displaying a second orientor in the second cycle display, wherein the second orientor identifies the second time period in the second cycle display.

14. The method of claim 11, further comprising:
receiving, by the automation system, a fourth user input to the user interface;
modifying, in response to the fourth user input, the third cycle display;
wherein modifying the fourth cycle display includes zooming the third cycle display or panning the third cycle display;
wherein zooming the third cycle display actuates the third cycle display and the timeline display to zoom simultaneously; and
wherein panning the third cycle display actuates the third cycle display and the timeline display to pan simultaneously.

15. The method of claim 1, wherein:
the first cycle display is the cycle status display; and
the second cycle display is the heartbeat cycle state display.

16. The method of claim 1, further comprising:
displaying a first orientor in the first cycle display, wherein the first orientor identifies the first time period in the first cycle display.

17. The method of claim 1, further comprising:
receiving, by an automation system including at least one processor, a second user input to the user interface indicating a selection of a second asset of the plurality of assets;
wherein said at least operation performed by the first asset is an at least first operation of the sequence of operations (SOP);
wherein the second asset is actuable to perform at least a second operation of the sequence of operations (SOP) for the plurality of operating cycles;
generating, via the automation system and in real time, a second cycle display of the second asset performing said at least one operation for the plurality of operating cycles;
wherein the second cycle display is selected from the group consisting of:
 a cycle status display;
 a heartbeat cycle state display; and
 a sequence of operations (SOP) cycle display;
displaying, via the user interface, the second cycle display and the timeline display; and
the timeline display displaying an actual time associated with the second asset performing said at least second operation for each operating cycle of the plurality of operating cycles displayed via the second cycle display; and
wherein the second cycle display, the first cycle display and the timeline display are concurrently displayed on the user interface.

18. The method of claim 17, further comprising:
generating an actual cycle time for each operating cycle of the plurality of operating cycles performed by the second asset, via the automation system;
determining a condition state for each operating cycle of the plurality of operating cycles performed by the second asset, via the automation system; and
displaying, via the second cycle display, an indication of the actual cycle time and an indication of the condition state for each operating cycle of the plurality of operating cycles performed by the second asset.

19. The method of claim 17, wherein:
the first cycle display is the cycle status display for the first asset; and
the second cycle display is the cycle status display for the second asset.

20. A system for displaying automation data for an automation system via an automation data display, the system comprising:
an automation system including:
a plurality of assets;
each asset of the plurality of assets actuable to perform at least one operation of an ordered sequence of operations (SOP) for a plurality of operating cycles;
a server configured to collect automation data from the plurality of assets and to store the automation data to a memory in communication with the server;
the memory having stored thereon the sequence of operations, an asset tree identifying the plurality of assets, a plurality of automation data templates and computer-executable instructions configured to generate a plurality of automation data displays and output the plurality of automation data displays and automation data in response to receipt of a user input from a user device;
the user device including a user interface actuable to display automation data including the plurality of automation data displays;
the automation system actuable to:
display an asset tree display on the user interface of the user device;
the asset tree display displaying a textual hierarchical representation of the plurality of assets;
receive a first user input to the asset tree displayed on the user interface indicating a selection of a first asset of the plurality of assets;
generate in real time, in response to the selection of the first asset, a first cycle display of the plurality of operating cycles of said at least one operation performed by the first asset;
wherein the first cycle display is selected from the group consisting of:
a cycle status display;
a heartbeat cycle state display; and
a sequence of operations (SOP) cycle display;
display, via the user interface, the first cycle display and a timeline display; and
wherein the timeline display displays an actual performance time of each operating cycle of the plurality of operating cycles performed by the first asset and displayed via the first cycle display.

* * * * *